(12) United States Patent
Long et al.

(10) Patent No.: US 11,427,048 B1
(45) Date of Patent: *Aug. 30, 2022

(54) RIDING MOWER TRAILING ARM SUSPENSION SYSTEM

(71) Applicant: Bad Boy Mowers, LLC, Batesville, AR (US)

(72) Inventors: Warren Long, Batesville, AR (US); Charles Bradley Covington, Batesville, AR (US)

(73) Assignee: Bad Boy Mowers, LLC, Batesville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,862

(22) Filed: Feb. 25, 2021

Related U.S. Application Data

(63) Continuation of application No. 16/576,088, filed on Sep. 19, 2019, now Pat. No. 10,953,715.

(51) Int. Cl.
| | |
|---|---|
| *B60G 7/00* | (2006.01) |
| *B60G 3/20* | (2006.01) |
| *B60G 3/04* | (2006.01) |
| *A01D 34/64* | (2006.01) |
| *B60K 7/00* | (2006.01) |

(52) U.S. Cl.
CPC ............... *B60G 7/006* (2013.01); *B60G 3/04* (2013.01); *B60G 3/202* (2013.01); *B60G 7/003* (2013.01); *B60G 7/005* (2013.01); *A01D 34/64* (2013.01); *B60G 2204/10* (2013.01); *B60G 2204/40* (2013.01); *B60G 2300/084* (2013.01); *B60K 7/0015* (2013.01)

(58) Field of Classification Search
CPC .... B60G 3/202; B60G 2300/084; B60G 3/04; B60K 7/0015
See application file for complete search history.

(56) References Cited

U.S. PATENT DOCUMENTS

| | | | |
|---|---|---|---|
| 2,442,831 | A | 6/1948 | Suttles |
| 2,689,136 | A | 9/1954 | Hendrickson |
| 2,915,776 | A | 12/1959 | Hanson et al. |
| 3,025,079 | A | 3/1962 | Gou |
| 3,669,467 | A | 3/1972 | Dunlap et al. |
| 3,737,174 | A | 6/1973 | Hickman |
| 4,310,171 | A | 1/1982 | Merkle |
| 4,310,717 | A | 1/1982 | Eastman et al. |
| 4,485,521 | A | 12/1984 | Welsch et al. |
| 4,559,669 | A | 12/1985 | Bonzer et al. |
| 4,903,545 | A | 2/1990 | Louis et al. |
| 5,156,576 | A | 10/1992 | Johnson |

(Continued)

OTHER PUBLICATIONS

"Hydro-Gear FZT (ZT-2200) Transmission" available at <https://www.youtube.com/watch?v=sdR7kGvRU10>, Feb. 5, 2013.

(Continued)

*Primary Examiner* — Jonathan Ng
*Assistant Examiner* — Mary E Young
(74) *Attorney, Agent, or Firm* — Pillsbury Winthrop Shaw Pittman LLP; Christopher L. Drymalla

(57) ABSTRACT

Provided is a trailing arm riding mower suspension system that includes trailing arms adapted to support hydraulic motor units and having leading ends pivotally coupled to a mower frame by way of leading end spherical joints and trailing ends having hydraulic drive unit mounts, where the trailing arms are adapted to pivot about leading end pivot locations defined by the leading end spherical joints.

29 Claims, 17 Drawing Sheets

(56) References Cited

U.S. PATENT DOCUMENTS

| | | | |
|---|---|---|---|
| 5,400,469 | A | 3/1995 | Simonsen |
| 5,542,494 | A | 8/1996 | Louis et al. |
| 5,899,470 | A | 5/1999 | Heitzmann |
| 5,979,920 | A | 11/1999 | Krakowiak et al. |
| 6,026,920 | A | 2/2000 | Obeda et al. |
| 6,170,242 | B1 | 1/2001 | Gordon |
| 6,460,318 | B1 | 10/2002 | Ferris et al. |
| 6,644,425 | B1 | 11/2003 | Hauser |
| 6,732,828 | B1 | 5/2004 | Abend et al. |
| 6,845,837 | B2 | 1/2005 | Ohashi et al. |
| 6,848,937 | B1 | 2/2005 | Hsiao |
| 6,857,254 | B2 | 2/2005 | Melone et al. |
| 6,889,793 | B2 | 5/2005 | Okada et al. |
| 7,127,889 | B1 | 10/2006 | Bennett et al. |
| 7,363,759 | B2 | 4/2008 | Ohashi et al. |
| 7,455,114 | B2 | 11/2008 | MacDougall |
| 7,588,104 | B2 | 9/2009 | Ohashi et al. |
| 7,621,353 | B2 | 11/2009 | Ishii et al. |
| 7,708,292 | B2 | 5/2010 | Foster |
| 8,141,886 | B1 | 3/2012 | Sugden et al. |
| 8,262,104 | B2 | 9/2012 | Kallevig et al. |
| 8,387,205 | B2 | 3/2013 | Weihl et al. |
| 8,393,236 | B1 | 3/2013 | Hauser et al. |
| 8,470,229 | B2 | 6/2013 | Nasvik et al. |
| 8,517,159 | B1 | 8/2013 | Langenfeld |
| 8,561,382 | B2 | 10/2013 | Gamble et al. |
| 8,662,212 | B2 | 3/2014 | Lawson, Jr. |
| 8,733,478 | B2 | 5/2014 | Chapman |
| 8,997,914 | B2 | 4/2015 | Umemoto et al. |
| 9,161,490 | B2 | 10/2015 | Melone et al. |
| 9,723,781 | B1 | 8/2017 | Covington |
| 9,730,386 | B1 | 8/2017 | Covington et al. |
| 9,821,689 | B2 | 11/2017 | Busboom et al. |
| 9,914,356 | B2 | 3/2018 | Simon |
| D830,419 | S | 10/2018 | Covington et al. |
| D830,420 | S | 10/2018 | Covington et al. |
| 10,188,033 | B1 | 1/2019 | Covington et al. |
| 10,349,577 | B1 | 7/2019 | Covington et al. |
| 10,356,978 | B1 | 7/2019 | Covington et al. |
| 10,485,168 | B1 | 11/2019 | Covington et al. |
| 10,569,609 | B1 | 2/2020 | Covington et al. |
| 10,709,065 | B1 | 7/2020 | Covington et al. |
| 10,721,864 | B1 | 7/2020 | Covington et al. |
| 10,953,715 | B1 | 3/2021 | Long et al. |
| 11,142,031 | B1 | 10/2021 | Covington et al. |
| 11,178,812 | B1 | 11/2021 | Crowl et al. |
| 11,178,815 | B1 | 11/2021 | Crowl et al. |
| 2005/0144923 | A1 | 7/2005 | Melone et al. |
| 2007/0029118 | A1 | 2/2007 | Acharya et al. |
| 2007/0284839 | A1 | 12/2007 | Sasaoka |
| 2008/0018269 | A1 | 1/2008 | Wyatt et al. |
| 2009/0033054 | A1 | 2/2009 | Foster |
| 2009/0302562 | A1 | 12/2009 | Kallevig et al. |
| 2011/0193309 | A1 | 8/2011 | Nance |
| 2011/0197419 | A1 | 8/2011 | Melone et al. |
| 2012/0000173 | A1 | 1/2012 | Papke et al. |
| 2013/0074466 | A1 | 3/2013 | Zwieg et al. |
| 2013/0264788 | A1 | 10/2013 | Smyth et al. |
| 2013/0291508 | A1 | 11/2013 | Melone et al. |
| 2016/0347137 | A1 | 12/2016 | Despres-Nadeau et al. |
| 2017/0028844 | A1 | 2/2017 | Melone et al. |
| 2018/0229570 | A1 | 8/2018 | Fay, II et al. |
| 2019/0193501 | A1 | 6/2019 | Brady et al. |
| 2020/0352098 | A1 | 11/2020 | Fujii et al. |

OTHER PUBLICATIONS

"Hydro-Gear ZI-3400 Product Presentation (english)" available at <https://www.youtube.com/watch?v=stZh8uQRh1A>, Feb. 6, 2012.

Bad Boy Mowers "AOS Diesel Model Mower Owner's & Parts Manual" 2010 Edition; pp. 1-40.

Bad Boy Mowers "AOS Model Mower Owner's & Parts Manual" 2010 Edition; pp. 1-40.

Bad Boy Mowers "Bad Boy AOS Part Manual: 35hp Vanguard; 27hp Kawasaki" 2007; pp. 1-31.

Bad Boy Mowers "Bad Boy Diesel Part Manual: 35hp Caterpillar Diesel; 28hp Caterpillar Diesel" 2007; pp. 1-30.

Bad Boy Mowers "Bad Boy Parts Manual for Pup and Lightning Models: 23hp Vanguard; 26hp Kawasaki; 30hp Kohler 32hp Vanguard" 2007; pp. 1-30.

Bad Boy Mowers "Compact Diesel Model Mower Owner's & Parts Manual" 2010 Edition; pp. 1-36.

Bad Boy Mowers "Diesel AOS & Compact Zero-Turn Mower Owner's, Service & Parts Manual" 2011; pp. 1-56.

Bad Boy Mowers "Diesel Compact Diesel Models Zero-Turn Mower Owner's, Service & Parts Manual" 2012; pp. 1-52 see pp. 33 and 35.

Bad Boy Mowers "Lightning & Pup Zero-Turn Mower Owner's, Service & Parts Manual" 2011; pp. 1-56.

Bad Boy Mowers "Outlaw Stand-On Model Zero-Turn Mower Owner's, Service & Parts Manual"; 2017; pp. 1-58.

Bad Boy Mowers "Outlaw XP Models Zero-Turn Mower Owner's, Service & Parts Manual" 2012; pp. 1-44; see pp. 29-30.

Bad Boy Mowers "Parts Manual for Bad Boy AOS Models: 35hp Vanguard; 27hp Kawasaki" 2008; pp. 1-29.

Bad Boy Mowers "Parts Manual for Bad Boy AOS Models: 35hp Vanguard; 27hp Kawasaki" 2009; pp. 1-28.

Bad Boy Mowers "Parts Manual for Bad Boy Diesel Models: 35hp Caterpillar; 28hp Caterpillar" 2008; pp. 1-28.

Bad Boy Mowers "Parts Manual for Bad Boy Diesel Models: 35hp Caterpillar; 28hp Caterpillar" 2009; pp. 1-27.

Bad Boy Mowers "Parts Manual for Bad Boy Pup and Lightning Models: 23hp Vanguard; 30hp Kohler; 26hp Kawasaki 32hp Vanguard; 31hp Kawasaki" 2008; pp. 1-36.

Bad Boy Mowers "Parts Manual for Bad Boy Pup and Lightning Models: 23hp Vanguard; 30hp Kohler; 26hp Kawasaki 32hp Vanguard; 31hp Kawasaki" 2009; pp. 1-33.

Bad Boy Mowers "Revolt Stand on Zero-Turn Mower Owner's, Service & Parts Manual"; 2019; pp. 1-52.

Bad Boy Mowers "Pup or Lightning Model Mower Owner's & Parts Manual" 2010 Edition; pp. 1-48.

Bad Boy Mowers "Rogue Outlaw Zero-Turn Mower Owner's, Service & Parts Manual" 2019; pp. 1-60.

Exmark Manufacturing Company, Inc.; "Staris E-Series" brochure; 2019; pp. 1-2.

Exmark Master Parts Viewer; "Model: STE600GKA44300 Year: 2019 Serial Range: 404314159-406294344" available as of Jun. 6, 2019 at: https://lookup3.toro.com/partdex/exmark/index.cfm?xCaller=exmark%26adv=y; p. 1.

Hydro-Gear; "ZI-2800/ZT-3100/ZT-3400 Integrated Zero-Turn Transaxle Service and Repair Manual" BLN-52441, Jan. 2013; pp. 1-52.

Parker; "Integrated Hydrostatic Transmissions HTE, HTJ and HTG Series" Oct. 2015; pp. 1-6.

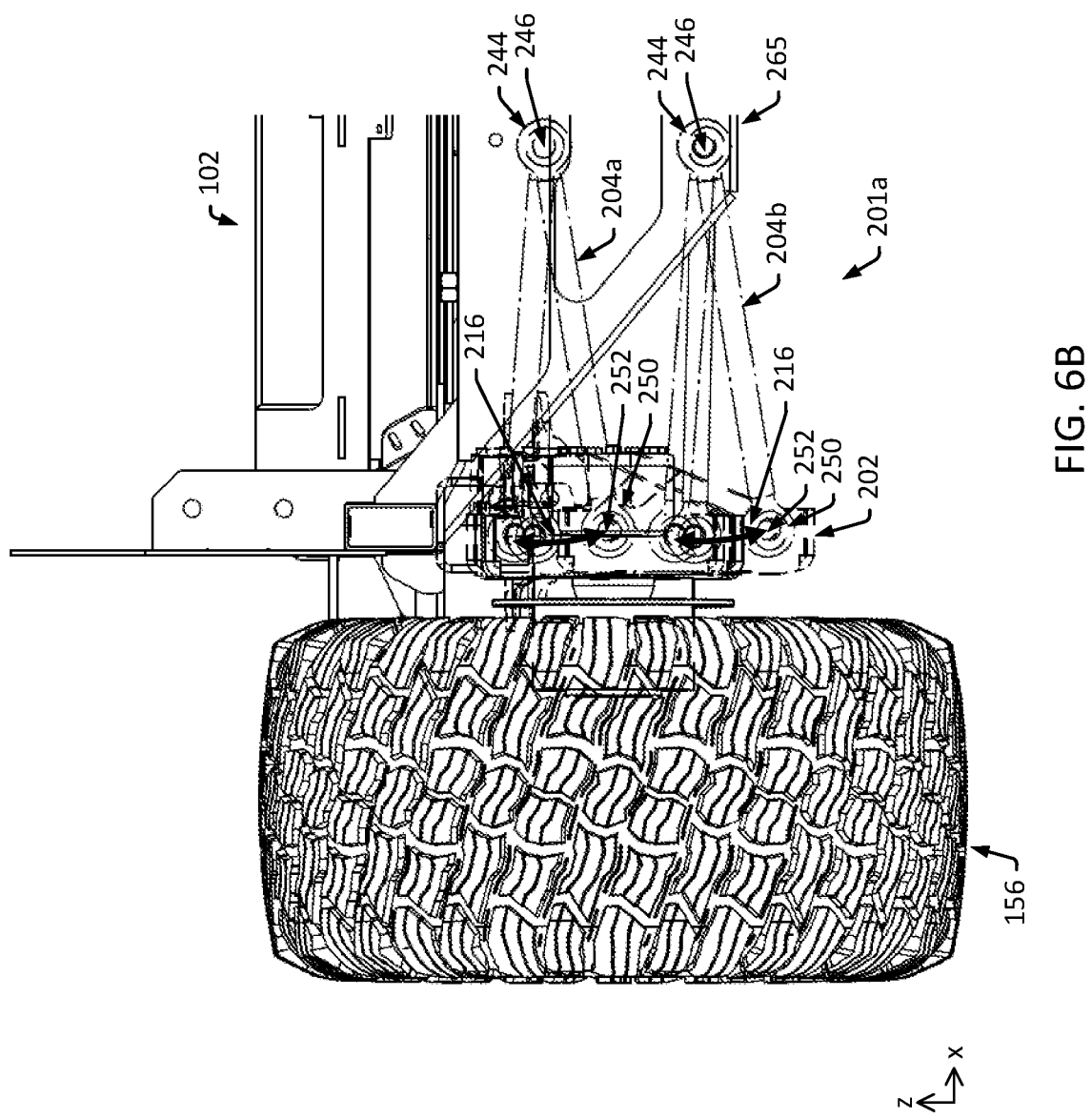

RIDING MOWER TRAILING ARM SUSPENSION SYSTEM

RELATED APPLICATIONS

This application is a continuation of U.S. patent Ser. No. 16/576,088 filed Sep. 19, 2019 and titled "Riding Mower Trailing Arm Suspension System", which is hereby incorporated by reference.

FIELD

Embodiments relate generally to mowing devices and more particularly to mowing device suspension systems.

BACKGROUND

A lawn mower (or "mower") is often used to cut (or "mow") grassy areas. A mower typically utilizes one or more rotating cutting blades that cut grass as the mower travels across the ground. A mower often takes the form of a walk-behind mower or a riding mower (or "ride-on" mower). A walk-behind mower is typically designed to be operated by an operator that walks behind and guides the mower. Some walk-behind mowers rely on the operator pushing the mower for propulsion (often referred to as "push" mowers). Some walk-behind mowers have a drive system (or "propulsion" system) that assist in propelling the mower (often referred to as "self-propelled" walk-behind mowers). A riding mower is typically designed to be operated by an operator that rides on and guides the mower along the terrain as it cuts grass. A riding mower normally includes an operator support, such as a seat or platform, and a drive system that propels the mower.

A zero-turn-radius (ZTR) riding mower is a particular type of riding mower. A ZTR riding mower is often identifiable by right and left control handles (or "control arms") that an operator can push or pull to drive respective right and left drive wheels forward or backward. This enables the mower to make sharp turns with ease, even spinning the entire mower in place—hence the label "zero-turn-radius." A ZTR riding mower is often desirable for its agility, speed, and wide mowing coverage. A ZTR mower typically employs drive units, such as hydrostatic (or "hydraulic") transaxles, that selectively rotate the right or left drive wheel forward or backward in response to pushing or pulling of the respective right or left control handle.

ZTR mowers often take the form of sit-on ZTR mowers or stand-on ZTR mowers. A sit-on ZTR mower typically includes a seat and is designed to be operated with the operator seated in the seat. A stand-on ZTR mower typically includes a platform and is designed to be operated with the operator standing on the platform. An operator may prefer a sit-on ZTR mower over a stand-on ZTR mower, for example, for the comfort provided by mowing in a seated position. An operator may prefer a stand-on ZTR mower over a sit-on ZTR mower, for example, for its compact footprint, easy on-and-off access, and the visual perspective provided in the standing position.

SUMMARY

Although zero-turn-radius (ZTR) riding mowers can provide advantages over other types of mowers, they can have shortcomings. For example, like other types of riding mowers, ZTR riding mowers may be operated over rough terrain (e.g., including bumps, holes, or debris) which can cause bouncing and jarring of the mower and the operator. This can be uncomfortable to the operator and can negatively affect the performance of the mower. For example, the bouncing and jarring of the mower may cause the deck and cutting blades to move relative to the ground, with at least some vertical component, while mowing. This can result in uneven cutting of the grass.

In view of these and other shortcomings, provided are embodiments of a riding mower suspension system. In some embodiments, the suspension system includes a trailing arm suspension that dampens jarring and vibrations of the mower. In some embodiments, the trailing arm suspension provides for independent "upward" and "rearward" movement of the rear wheels of the mower to help dampen jarring and vibrations of the mower as it traverses terrain. In some embodiments, a combination of upward and rearward movement of the wheels occurs along an arced path defined by control arms that support and guide movement of the wheels. For example, the trailing arm suspension system may include left and right longitudinally oriented control arms (or "longitudinal control arms" or "trailing arms") that are oriented substantially parallel to a longitudinal axis of the mower. A "front" (or "leading") end of each of the trailing arms may be pivotally coupled to the frame and a "rear" (or "trailing") end of each of the trailing arms may support a respective left or right rear wheel of the mower. The pivotal coupling may define a pivot location about which the trailing arm pivots, and the trailing arm may be biased (e.g., by one or more resilient members) such that the rotational center of the attached wheel is located below the pivot location. For example, the trailing arm may be biased such that the rotational center of the attached wheel (e.g., defined by a point where an axis about which the wheel rotates (or "rotational axis" of the wheel) crosses through the wheel) is normally located below the pivot location of the trailing arm (e.g., while the mower is at rest or is moving across relatively flat ground ground). When the mower is moving forward and one of the rear wheels encounters an impediment (e.g., a rock) that urges the wheel upward, the associated trailing arm may guide the wheel along an arc path that moves the wheel upward and rearward relative to the frame and other components of the mower. The combination of upward and rearward movement of the wheel may enhance the dampening of the impact of the wheel with the impediment. For example, in the case of the wheel rolling into a rock on the ground, the upward movement of the wheel may absorb vertical elements of the impact and the rearward movement may absorb horizontal elements of the impact, both of which may otherwise be transferred to the operator and components of the mower.

In some embodiments, the suspension system includes lateral control arms that regulate lateral positioning and movement of the trailing arms and the associated rear wheels. For example, the trailing arm suspension system may include pairs of left and right laterally oriented control arms (or "lateral control arms") that are oriented transverse to the longitudinal axis of the mower, with each pair including an upper control arm and a lower control arm. An "inside" end of each of the lateral control arms may be pivotally coupled to the frame of the mower and an "outside" end of each of the lateral control arms may be pivotally coupled to the trailing end of a respective one of the left or right trailing arms. The lateral control arms may maintain the lateral (or "sideways") positioning of the trailing ends of the trailing arms and the associated rear wheels.

In some embodiments, one or both of the trailing arms and the lateral control arms have adjustable lengths. Such an arrangement may enable fine tuning of the orientation and movement of the trailing arms and the associated wheels. For example, the length of a trailing arm may be adjusted to adjust the longitudinal positioning of the associated rear wheel. The lengths of the lateral control arms coupled to a trailing arm may, for example, be adjusted to adjust the lateral positioning, the "toe" or the "camber" of the trailing arm and the associated wheel.

Accordingly, described embodiments may provide a suspension system with enhanced performance and adjustability. Although some embodiments are described in the context of sit-on ZTR riding mowers for the purpose of illustration, described embodiments may be employed in other contexts. For example, described embodiments may be employed with other types of mowers, such as stand-on ZTR riding mowers or other types of riding mowers.

Provided in some embodiments is a ZTR riding mower system that includes: a mower frame; rear wheels, including: a left rear wheel; and a right rear wheel; a hydraulic drive system, including: a left hydraulic drive unit adapted to drive rotation of the left rear wheel, the left hydraulic drive unit including: a left hydraulic pump unit; a left hydraulic motor unit; and a left axle adapted to couple to the left rear wheel, where the left hydraulic drive unit is adapted to rotate the left axle to drive the rotation of the left rear wheel; and a right hydraulic drive unit adapted to drive rotation of the right rear wheel, the right the hydraulic drive unit including: a right hydraulic pump unit; a right hydraulic motor unit; and a right axle adapted to couple to the right rear wheel, where the right hydraulic drive unit is adapted to rotate the right axle to drive the rotation of the right rear wheel; and a trailing arm independent rear suspension system including: a left trailing arm suspension system including: a left trailing arm adapted to support the left hydraulic motor unit and the left rear wheel, the left trailing arm including: a leading end adapted to pivotally couple to the mower frame by way of a left leading end ball joint, where the left trailing arm is adapted to pivot about a left leading end pivot location defined by the left leading end ball joint; a trailing end including a left hydraulic drive unit mount, where the left hydraulic drive unit is adapted to couple to the left hydraulic drive unit mount; an upper left lateral control arm including: an upper left inner end adapted to pivotally couple to the mower frame by way of an upper left inside end joint; and an upper left outer end adapted to pivotally couple to the trailing end of the left trailing arm by way of an upper left outside end joint; and a lower left lateral control arm including: a lower left inner end adapted to pivotally couple to the mower frame by way of a lower left inside end joint; and a lower left outer end adapted to pivotally couple to the trailing end of the left trailing arm by way of a lower left outside end joint; and a right trailing arm suspension system including: a right trailing arm adapted to support the right hydraulic motor unit and the right rear wheel, the right trailing arm including: a leading end adapted to pivotally couple to the mower frame by way of a right leading end ball joint, where the right trailing arm is adapted to pivot about a right leading end pivot location defined by the right leading end ball joint; a trailing end including a right hydraulic drive unit mount, where the right hydraulic drive unit is adapted to couple to the right hydraulic drive unit mount; an upper right lateral control arm including: an upper right inner end adapted to pivotally couple to the mower frame by way of an upper right inside end joint; and an upper right outer end adapted to pivotally couple to the trailing end of the right trailing arm by way of an upper right outside end joint; and a lower right lateral control arm including: a lower right inner end adapted to pivotally couple to the mower frame by way of a lower right inside end joint; and a lower right outer end adapted to pivotally couple to the trailing end of the right trailing arm by way of a lower right outside end joint.

In some embodiments, the left leading end ball joint is adapted to enable the left trailing arm to pivot in three dimensions about the left leading end pivot location, and the right leading end ball joint is adapted to enable the right trailing arm to pivot in three dimensions about the right leading end pivot location. In some embodiments, the left leading end ball joint includes a spherical bearing adapted to enable the left trailing arm to pivot in multiple dimensions about the left leading end pivot location, and the right leading end ball joint includes a spherical bearing adapted to enable the right trailing arm to pivot in multiple dimensions about the right leading end pivot location. In some embodiments, a length of the left trailing arm is adjustable to enable adjustment of longitudinal positioning of the left axle and the left rear wheel, and a length of the right trailing arm is adjustable to enable adjustment of longitudinal positioning of the right axle and the right rear wheel. In some embodiments, the left leading end ball joint includes an adjustable joint adapted to enable adjustment of longitudinal positioning of the left axle and the left rear wheel, and the right leading end ball joint includes an adjustable joint adapted to enable adjustment of longitudinal positioning of the right axle and the right rear wheel. In some embodiments, the left leading end ball joint includes an adjustable ball joint adapted to enable adjustment of a distance between the left leading end pivot location and a rotational axis of the left axle, and the right leading end ball joint includes an adjustable ball joint adapted to enable adjustment of a distance between the right leading end pivot location and a rotational axis of the right axle. In some embodiments, the upper left inside end joint includes a ball joint, and where the upper left lateral control arm is adapted to pivot about an upper left inside pivot location defined by the ball joint of the upper left inside end joint, the upper left outside end joint includes a ball joint, and where the upper left lateral control arm is adapted to pivot about an upper left outside pivot location defined by the ball joint of the upper left outside end joint, the upper right inside end joint includes a ball joint, and where the upper right lateral control arm is adapted to pivot about an upper right inside pivot location defined by the ball joint of the upper right inside end joint, and the upper right outside end joint includes a ball joint, and where the upper right lateral control arm is adapted to pivot about an upper right outside pivot location defined by the ball joint of the upper right outside end joint. In some embodiments, a length of at least one of the upper left lateral control arm and the lower left lateral control arm is adjustable, and a length of at least one of the upper right lateral control arm and the lower right lateral control arm is adjustable. In some embodiments, the left hydraulic drive unit mount includes an opening in the trailing end of the left trailing arm that is adapted to accept the left hydraulic motor unit, and the right hydraulic drive unit mount includes an opening in the trailing end of the right trailing arm that is adapted to accept the right hydraulic motor unit. In some embodiments, the left leading end pivot location is vertically offset above a rotational axis of the left axle, and the right leading end pivot location is vertically offset above a rotational axis of the right axle. In some embodiments, the left trailing arm is oriented substantially parallel to a longitudinal axis of the ZTR riding mower system, the upper left lateral control arm and the lower left lateral control arm are oriented transverse to the longitudinal axis of the ZTR riding mower system, the right trailing arm is oriented substantially parallel to a longitudinal axis of the ZTR riding mower system, and the upper right lateral control arm and the lower right lateral control arm are oriented transverse to the longitudinal axis of the ZTR riding mower system. In some embodiments, the left trailing arm suspension system further includes a left resilient member adapted to dampen movement of the left trailing arm, and the right trailing arm suspension system further includes a right resilient member adapted to dampen movement of the right trailing arm. In some embodiments, the left trailing arm suspension system further includes a left resilient member disposed between the left trailing arm and an element of the mower frame, and the right trailing arm suspension system further includes a right resilient member disposed between the right trailing arm and an element of the mower frame. In some embodiments, the left hydraulic pump unit is remote from the left hydraulic motor unit and is fluidly coupled to the left hydraulic motor unit by way of left flexible hoses, and the right hydraulic pump unit is remote from the right hydraulic motor unit and is fluidly coupled to the right hydraulic motor unit by way of right flexible hoses.

Provided in some embodiments is a riding mower system that includes: a hydraulic drive system, including: a left hydraulic drive unit including: a left hydraulic motor unit; and a left axle adapted to couple to a left rear wheel, where the left hydraulic motor unit is adapted to rotate the left axle to drive rotation of the left rear wheel; and a right hydraulic drive unit including: a right hydraulic motor unit; and a right axle adapted to couple to a right rear wheel, where the right hydraulic motor unit is adapted to rotate the right axle to drive rotation of the right rear wheel; and a trailing arm independent rear suspension system including: a left trailing arm suspension system including: a left trailing arm adapted to support the left hydraulic motor unit, the left trailing arm including: a leading end adapted to pivotally couple to a frame of the mower by way of a left leading end spherical joint, where the left trailing arm is adapted to pivot about a left leading end pivot location defined by the left leading end spherical joint; a trailing end including a left hydraulic drive unit mount, where the left hydraulic drive unit is adapted to couple to the left hydraulic drive unit mount; an upper left lateral control arm including: an upper left inner end adapted to pivotally couple to the frame of the mower by way of an upper left inside end joint; an upper left outer end adapted to pivotally couple to the trailing end of the left trailing arm by way of an upper left outside end joint; and a lower left lateral control arm including: a lower left inner end adapted to pivotally couple to the frame of the mower by way of a lower left inside end joint; and a lower left outer end adapted to pivotally couple to the trailing end of the left trailing arm by way of a lower left outside end joint; and a right trailing arm suspension system including: a right trailing arm adapted to support the right hydraulic motor unit, the right trailing arm including: a leading end adapted to pivotally couple to the frame by way of a right leading end spherical joint, where the right trailing arm is adapted to pivot about a right leading end pivot location defined by the right leading end spherical joint; a trailing end including a right hydraulic drive unit mount, where the right hydraulic drive unit is adapted to couple to the right hydraulic drive unit mount; an upper right lateral control arm including: an upper right inner end adapted to pivotally couple to the frame of the mower by way of an upper right inside end joint; an upper right outer end adapted to pivotally couple to the trailing end of the right trailing arm by way of an upper right outside end joint; and a lower right lateral control arm including: a lower right inner end adapted to pivotally couple to the frame of the mower by way of a lower right inside end joint; and a lower right outer end adapted to pivotally couple to the trailing end of the right trailing arm by way of a lower right outside end joint.

In some embodiments, the left leading end spherical joint is adapted to enable the left trailing arm to pivot in multiple dimensions about the left leading end pivot location, and the right leading end spherical joint is adapted to enable the right trailing arm to pivot in multiple dimensions about the right leading end pivot location. In some embodiments, the left leading end spherical joint includes a spherical bearing adapted to enable the left trailing arm to pivot in multiple dimensions about the left leading end pivot location, and the right leading end spherical joint includes a spherical bearing adapted to enable the right trailing arm to pivot in multiple dimensions about the right leading end pivot location. In some embodiments, a length of the left trailing arm is adjustable to enable adjustment of longitudinal positioning of the left axle, and a length of the right trailing arm is adjustable to enable adjustment of longitudinal positioning of the right axle. In some embodiments, the left leading end spherical joint includes an adjustable joint adapted to enable adjustment of a length of the left trailing arm, and the right leading end spherical joint includes an adjustable joint adapted to enable adjustment of a length of the right trailing arm. In some embodiments, the left leading end spherical joint includes an adjustable joint adapted to enable adjustment of a distance between the left leading end pivot location and a rotational axis of the left axle, and the right leading end spherical joint includes an adjustable joint adapted to enable adjustment of a distance between the right leading end pivot location and a rotational axis of the right axle. In some embodiments, the upper left inside end joint includes a spherical joint, and where the upper left lateral control arm is adapted to pivot about an upper left inside pivot location defined by the spherical joint of the upper left inside end joint, the upper left outside end joint includes a spherical joint, and where the upper left lateral control arm is adapted to pivot about an upper left outside pivot location defined by the spherical joint of the upper left outside end joint, the lower left inside end joint includes a spherical joint, and where the lower left lateral control arm is adapted to pivot about a lower left inside pivot location defined by the spherical joint of the lower left inside end joint, the lower left outside end joint includes a spherical joint, and where the lower left lateral control arm is adapted to pivot about a lower left outside pivot location defined by the spherical joint of the lower left outside end joint, the upper right inside end joint includes a spherical joint, and where the upper right lateral control arm is adapted to pivot about an upper right inside pivot location defined by the spherical joint of the upper right inside end joint, the upper right outside end joint includes a spherical joint, and where the upper right lateral control arm is adapted to pivot about an upper right outside pivot location defined by the spherical joint of the upper right outside end joint, the lower right inside end joint includes a spherical joint, and where the lower right lateral control arm is adapted to pivot about a lower right inside pivot location defined by the spherical joint of the lower right inside end joint, and the lower right outside end joint includes a spherical joint, and where the lower right lateral control arm is adapted to pivot about a lower right outside pivot location defined by the spherical joint of the lower right outside end joint. In some embodiments, a length of at least one of the upper left lateral control arm and the lower left lateral control arm is adjustable, and a length of at least one of the upper right lateral control arm and the lower right lateral control arm is adjustable. In some embodiments, the left hydraulic drive unit mount includes an opening in the trailing end of the left trailing arm, and the right hydraulic drive unit mount includes an opening in the trailing end of the right trailing arm. In some embodiments, the left leading end pivot location is vertically offset above a rotational axis of the left axle, and the right leading end pivot location is vertically offset above a rotational axis of the right axle. In some embodiments, the left trailing arm is oriented substantially parallel to a longitudinal axis of the ZTR riding mower system, and where the upper left lateral control arm and the lower left lateral control arm are oriented transverse to the longitudinal axis of the ZTR riding mower system, and the right trailing arm is oriented substantially parallel to a longitudinal axis of the ZTR riding mower system, and where the upper right lateral control arm and the lower right lateral control arm are oriented transverse to the longitudinal axis of the ZTR riding mower system. In some embodiments, the left trailing arm suspension system further includes a left resilient member adapted to dampen movement of the left trailing arm, and the right trailing arm suspension system further includes a right resilient member adapted to dampen movement of the right trailing arm. In some embodiments, the left trailing arm suspension system further includes a left resilient member disposed between the left trailing arm and the frame of the mower, and the right trailing arm suspension system further includes a right resilient member disposed between the right trailing arm and the frame of the mower. In some embodiments, the left hydraulic motor unit is fluidly coupled to a remote left hydraulic pump unit by way of left flexible hoses, and the right hydraulic motor unit is fluidly coupled to a remote right hydraulic pump unit by way of right flexible hoses.

Provided in some embodiments a ZTR riding mower system that includes: a mower frame; rear wheels, including: a left rear wheel; and a right rear wheel; a hydraulic drive system, including: a left hydraulic drive unit adapted to drive rotation of the left rear wheel, the left hydraulic drive unit including: a left hydraulic pump unit; a left hydraulic motor unit; and a left axle adapted to couple to the left rear wheel, where the left hydraulic drive unit is adapted to rotate the left axle to drive the rotation of the left rear wheel; and a right hydraulic drive unit adapted to drive rotation of the right rear wheel, the right the hydraulic drive unit including: a right hydraulic pump unit; a right hydraulic motor unit; and a right axle adapted to couple to the right rear wheel, where the right hydraulic drive unit is adapted to rotate the right axle to drive the rotation of the right rear wheel; and a trailing arm independent rear suspension system including: a left trailing arm suspension system including: a left trailing arm adapted to support the left hydraulic motor unit and the left rear wheel, the left trailing arm including: a leading end including a left leading end ball joint pivotally coupling the left trailing arm to the mower frame, where the left trailing arm is adapted to pivot about a left leading end pivot location defined by the left leading end ball joint; a trailing end including a left hydraulic drive unit mount, where the left hydraulic drive unit is adapted to couple to the left hydraulic drive unit mount, an upper left lateral control arm including: an upper left inner end including an upper left inside end joint pivotally coupling the upper left lateral control arm to the mower frame; and an upper left outer end including an upper left outside end joint pivotally coupling the upper left lateral control arm to the trailing end of the left trailing arm; and a lower left lateral control arm including: a lower left inner end including a lower left inside end joint pivotally coupling the lower left lateral control arm to the mower frame; and a lower left outer end including a lower left outside end joint pivotally coupling the lower left lateral control arm to the trailing end of the left trailing arm; and a right trailing arm suspension system including: a right trailing arm adapted to support the right hydraulic motor unit and the right rear wheel, the right trailing arm including: a leading end including a right leading end ball joint pivotally coupling the right trailing arm to the mower frame, where the right trailing arm is adapted to pivot about a right leading end pivot location defined by the right leading end ball joint; a trailing end including a right hydraulic drive unit mount, where the right hydraulic drive unit is adapted to couple to the right hydraulic drive unit mount, an upper right lateral control arm including: an upper right inner end including an upper right inside end joint pivotally coupling the upper right lateral control arm to the mower frame; and an upper right outer end including an upper right outside end joint pivotally coupling the upper right lateral control arm to the trailing end of the right trailing arm; and a lower right lateral control arm including: a lower right inner end including a lower right inside end joint pivotally coupling the lower right lateral control arm to the mower frame; and a lower right outer end including a lower right outside end joint pivotally coupling the lower right lateral control arm to the trailing end of the right trailing arm.

In some embodiments, the left leading end ball joint is adapted to enable the left trailing arm to pivot in three dimensions about the left leading end pivot location, and the right leading end ball joint is adapted to enable the right trailing arm to pivot in three dimensions about the right leading end pivot location. In some embodiments, the left leading end ball joint includes a spherical bearing adapted to enable the left trailing arm to pivot in multiple dimensions about the left leading end pivot location, and the right leading end ball joint includes a spherical bearing adapted to enable the right trailing arm to pivot in multiple dimensions about the right leading end pivot location. In some embodiments, a length of the left trailing arm is adjustable to enable adjustment of longitudinal positioning of the left axle and the left rear wheel, and a length of the right trailing arm is adjustable to enable adjustment of longitudinal positioning of the right axle and the right rear wheel. In some embodiments, the left leading end ball joint includes an adjustable joint adapted to enable adjustment of a length of the left trailing arm, and the right leading end ball joint includes an adjustable joint adapted to enable adjustment of a length of the right trailing arm. In some embodiments, the left leading end ball joint includes an adjustable ball joint adapted to enable adjustment of a distance between the left leading end pivot location and a rotational axis of the left axle, and the right leading end ball joint includes an adjustable ball joint adapted to enable adjustment of a distance between the right leading end pivot location and a rotational axis of the right axle. In some embodiments, the upper left inside end joint includes a ball joint, and where the upper left lateral control arm is adapted to pivot about an upper left inside pivot location defined by the ball joint of the upper left inside end joint, the upper left outside end joint includes a ball joint, and where the upper left lateral control arm is adapted to pivot about an upper left outside pivot location defined by the ball joint of the upper left outside end joint, the upper right inside end joint includes a ball joint, and where the upper right lateral control arm is adapted to pivot about an upper right inside pivot location defined by the ball joint of the upper right inside end joint, and the upper right outside end joint includes a ball joint, and where the upper right lateral control arm is adapted to pivot about an upper right outside pivot location defined by the ball joint of the upper right outside end joint. In some embodiments, a length of at least one of the upper left lateral control arm and the lower left lateral control arm is adjustable, and a length of at least one of the upper right lateral control arm and the lower right lateral control arm is adjustable. In some embodiments, the left hydraulic drive unit mount includes an opening in the trailing end of the left trailing arm, and the right hydraulic drive unit mount includes an opening in the trailing end of the right trailing arm. In some embodiments, the left leading end pivot location is vertically offset above a rotational axis of the left axle, and the right leading end pivot location is vertically offset above a rotational axis of the right axle. In some embodiments, the left trailing arm is oriented substantially parallel to a longitudinal axis of the ZTR riding mower system, and where the upper left lateral control arm and the lower left lateral control arm are oriented transverse to the longitudinal axis of the ZTR riding mower system, and the right trailing arm is oriented substantially parallel to a longitudinal axis of the ZTR riding mower system, and where the upper right lateral control arm and the lower right lateral control arm are oriented transverse to the longitudinal axis of the ZTR riding mower system. In some embodiments, the left trailing arm suspension system further includes a left resilient member adapted to dampen movement of the left trailing arm, and the right trailing arm suspension system further includes a right resilient member adapted to dampen movement of the right trailing arm. In some embodiments, the left trailing arm suspension system further includes a left resilient member disposed between the left trailing arm and the mower frame, and the right trailing arm suspension system further includes a right resilient member disposed between the right trailing arm and the mower frame. In some embodiments, the left hydraulic pump unit is remote from the left hydraulic motor unit and is fluidly coupled to the left hydraulic motor unit by way of left flexible hoses, and the right hydraulic pump unit is remote from the right hydraulic motor unit and is fluidly coupled to the right hydraulic motor unit by way of right flexible hoses.

BRIEF DESCRIPTION OF THE DRAWINGS

FIG. 6B is a back/rear view of a mower system that illustrates movement of components of a mower trailing arm suspension system (and related components) in accordance with one or more embodiments.

Figure 1A:
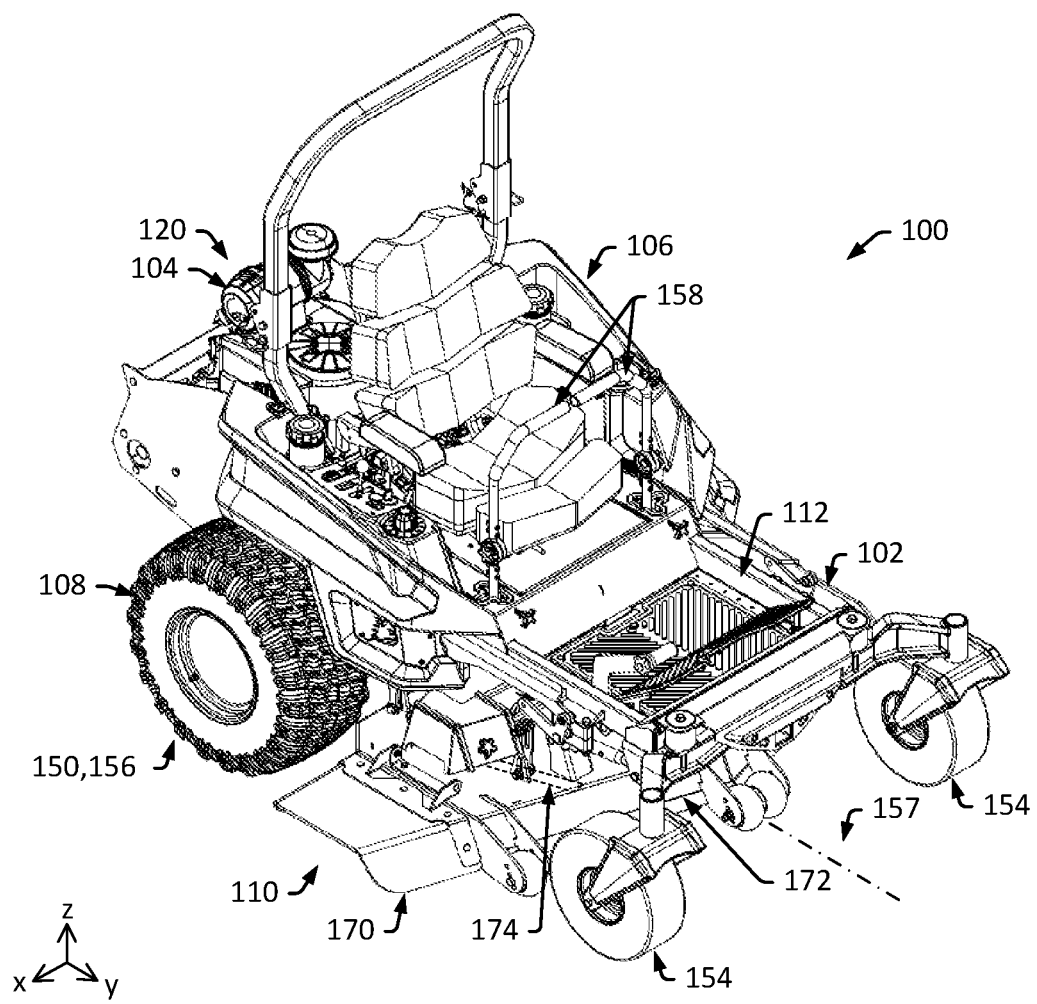
FIGS. 1A and 1B are diagrams that illustrate a mower system in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Provided are embodiments of a riding mower suspension system. In some embodiments, the suspension system includes a trailing arm suspension that dampens jarring and vibrations of the mower. In some embodiments, the trailing arm suspension provides for independent "upward" and "rearward" movement of the rear wheels of the mower to help dampen jarring and vibrations of the mower as it traverses terrain. In some embodiments, a combination of upward and rearward movement of the wheels occurs along an arced path defined by control arms that support and guide movement of the wheels. For example, the trailing arm suspension system may include left and right longitudinally oriented control arms (or "longitudinal control arms" or "trailing arms") that are oriented substantially parallel to a longitudinal axis of the mower. A "front" (or "leading") end of each of the trailing arms may be pivotally coupled to the frame and a "rear" (or "trailing") end of each of the trailing arms may support a respective left or right rear wheel of the mower. The pivotal coupling may define a pivot location about which the trailing arm pivots, and the trailing arm may be biased (e.g., by one or more resilient members) such that the rotational center of the attached wheel is located below the pivot location. For example, the trailing arm may be biased such that the rotational center of the attached wheel (e.g., defined by a point where an axis about which the wheel rotates (or "rotational axis" of the wheel) crosses through the wheel) is normally located below the pivot location of the trailing arm (e.g., while the mower is at rest or is moving across relatively flat ground ground). When the mower is moving forward and one of the rear wheels encounters an impediment (e.g., a rock) that urges the wheel upward, the associated trailing arm may guide the wheel along an arc path that moves the wheel upward and rearward relative to the frame and other components of the mower. The combination of upward and rearward movement of the wheel may enhance the dampening of the impact of the wheel with the impediment. For example, in the case of the wheel rolling into a rock on the ground, the upward movement of the wheel may absorb vertical elements of the impact and the rearward movement may absorb horizontal elements of the impact, both of which may otherwise be transferred to the operator and components of the mower.

In some embodiments, the suspension system includes lateral control arms that regulate lateral positioning and movement of the trailing arms and the associated rear wheels. For example, the trailing arm suspension system may include pairs of left and right laterally oriented control arms (or "lateral control arms") that are oriented transverse to the longitudinal axis of the mower, with each pair including an upper control arm and a lower control arm. An "inside" end of each of the lateral control arms may be pivotally coupled to the frame of the mower and an "outside" end of each of the lateral control arms may be pivotally coupled to the trailing end of a respective one of the left or right trailing arms. The lateral control arms may maintain the lateral (or "sideways") positioning of the trailing ends of the trailing arms and the associated rear wheels.

In some embodiments, one or both of the trailing arms and the lateral control arms have adjustable lengths. Such an arrangement may enable fine tuning of the orientation and movement of the trailing arms and the associated wheels. For example, the length of a trailing arm may be adjusted to adjust the longitudinal positioning of the associated rear wheel. The lengths of the lateral control arms coupled to a trailing arm may, for example, be adjusted to adjust the lateral positioning, the "toe" or the "camber" of the trailing arm and the associated wheel.

Accordingly, described embodiments may provide a suspension system with enhanced performance and adjustability. Although some embodiments are described in the context of sit-on ZTR riding mowers for the purpose of illustration, described embodiments may be employed in other contexts. For example, described embodiments may be employed with other types of mowers, such as stand-on ZTR riding mowers or other types of riding mowers.

Figure 1B:
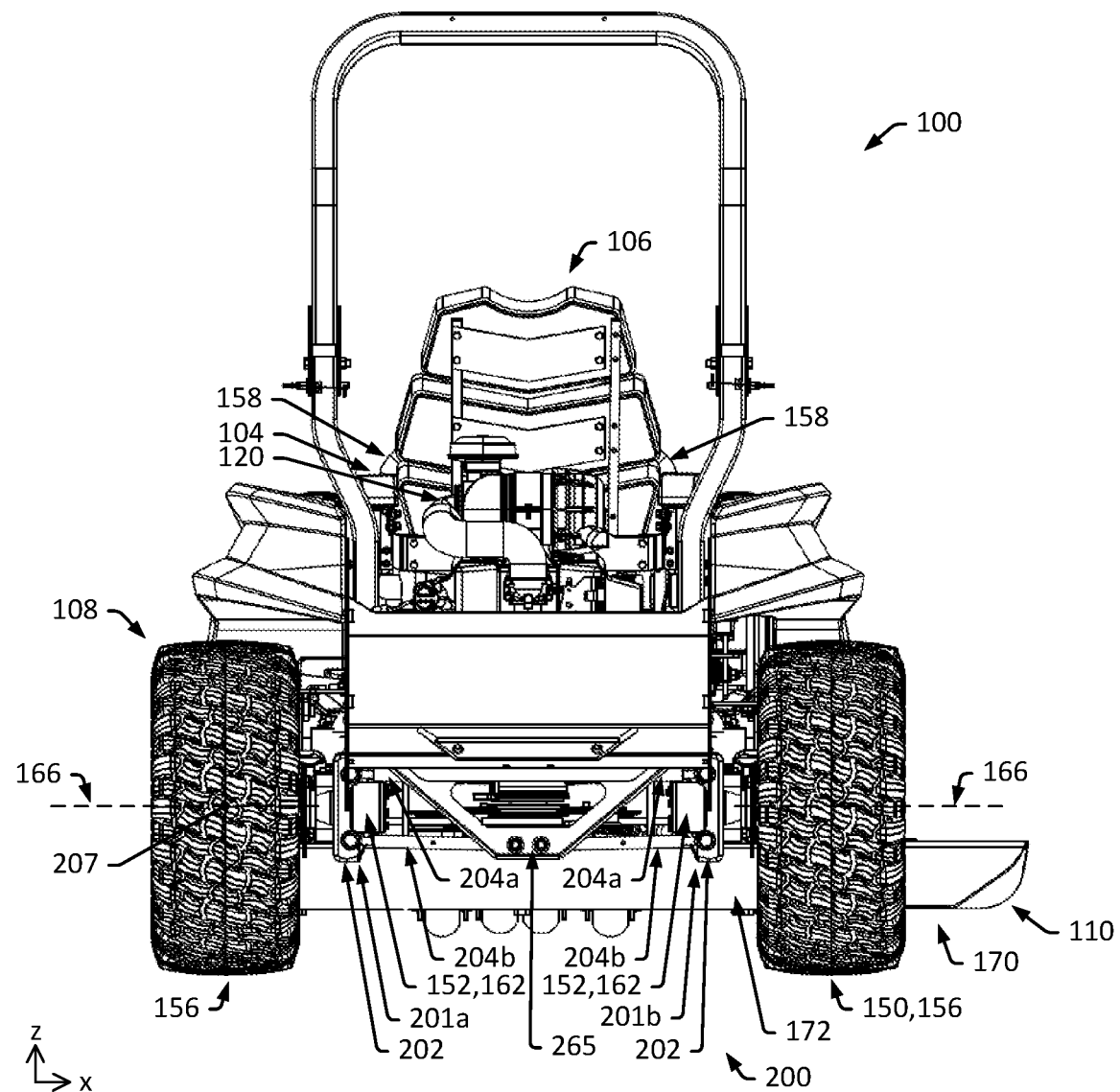

FIG. 1 is a diagram that illustrates a sit-on zero-turn-radius (ZTR) riding mower (or "mower") 100 in accordance with one or more embodiments. In some embodiments, the mower 100 includes a frame system (or "frame") 102, a power system 104, a control system 106, a drive system 108, a cutting system 110, and a trailing arm independent rear suspension system (or "suspension system") 200 (see, e.g., FIGS. 1A, 1B and 2).

Referring to FIG. 1, in some embodiments, the frame system (or "frame") 102 is a rigid structure that supports components of the mower 100. For example, the frame 102 may include members that are rigidly fastened to one another such that they do not move relative to one another. In some embodiments, the frame 102 includes a frame weldment 112. The frame weldment 112 may include a rigid metal structure formed of multiple metal members that are welded, or similarly fastened, together. Other components of the mower 100 may be coupled to the frame 102 to position them relative to the frame 102 and to one another.

In some embodiments, the power system 104 includes a motor 120. The motor 120 may supply motive power used to operate the mower 100. In some embodiments, the motor 120 includes an engine, such as an internal combustion engine (e.g., a gas-fueled engine, a diesel-fueled engine, a natural gas-fueled engine, or a similarly fueled engine) or an electric motor. In some embodiments, the motor 120 is coupled to the frame 102. For example, the motor 120 may be bolted, or similarly fastened, to the frame weldment 112. In some embodiments, the power generated by the motor 120 rotates (or "drives") a drive shaft of the motor 120, which can be used as motive power for other components of the mower 100. For example, the power generated by the motor 120 may drive rotation of the drive shaft, which drives circulation of drive belts that transmit motive power from the drive shaft to the drive system 108 and the cutting system 110.

In some embodiments, one or more drive pulleys are coupled to the drive shaft of the motor 120. The drive pulleys may include, for example, a pump drive pulley and a deck drive pulley. In some embodiments, the drive pulleys engage with respective drive belts that are employed to transmit motive power to other components of the mower 100. For example, the pump drive pulley may engage with a pump drive belt (or "pump belt") that is circulated to transmit motive power to the drive system 108. The deck drive pulley may engage with a deck drive belt (or "deck belt") that is circulated to transmit motive power to the cutting system 110. During operation of the mower 100, the motor 120 may be operated to rotate the drive shaft, the pump drive pulley and the deck drive pulley, which, in turn, drives circulation of the pump drive belt and circulation of the deck drive belt.

In some embodiments, the control system 106 includes controls for regulating operation of the mower 100. For example, the control system 106 may include an ignition switch (e.g., a switch operable to start or stop operation of the motor 120), a throttle control (e.g., a knob operable to regulate the operational speed of the motor 120), a blade control (e.g., a knob operable to engage or disengage the cutting system 110), a wheel brake control (e.g., a lever operable to engage or disengage a wheel brake), a deck height control (e.g., a lever to adjust a height of a cutting deck), or a user interface (e.g., a display of status information for the mower 100, such as motor hours and oil level). An operator may interact with the control system 106 to control and monitor various aspects of the operation of the mower 100.

In some embodiments, the drive system (or "propulsion system") 108 includes components for propelling (or "driving") the mower 100 across the ground. In some embodiments, the drive system 108 includes wheel assemblies (or "wheels") 150 and one or more drive units 152 that supply motive power to certain ones of the wheels 150 (see, e.g., FIGS. 1B and 2). For example, the drive system 108 may include right and left forward wheels (or "front wheels") 154, right and left rear wheels (or "back wheels") 156, and right and left drive units 152 operable to drive rotation of the right and left rear wheels 156, respectively. Each of the wheels 150 may include a tire coupled a wheel.

For reference, the right and left sides of the mower 100 may be defined relative to the direction in which an operator is expected to be primarily facing while operating the mower 100. "Forward" may refer to the direction that an operator is expected to be primarily facing while operating the mower 100. In accordance with the coordinate system axes illustrated, "right" may refer to the positive "x" direction, "left" may refer to the negative "x" direction, "front" (or "forward") may refer to the positive "y" direction, "back" (or "rearward" or "backward") may refer to the negative "y" direction, "up" (or "upward") may refer to the positive "z" direction, and "down" (or "downward") may refer to the negative "z" direction. A longitudinal axis 157 of the mower 100 may be oriented in the "y" direction, for example, passing through or near a midpoint between the rear wheels 156 of the mower 100.

The front wheels 154 may be positioned at or near a front end of the frame 102 to support a front portion of the mower 100. In some embodiments, the front wheels 154 are caster wheels that swivel about a vertically oriented rotational axis (e.g., a rotational axis oriented in the y-direction) in response to corresponding movements of the mower 100. The front wheels 154 may be referred to as "non-driven" wheels in that they do not receive motive power intended to propel the mower 100. The rear wheels 156 may be positioned at or near a rear end of the frame system 102 to support a rear portion of the mower 100. In some embodiments, the drive units 152 drive rotation of the rear wheels 156 to propel the mower 100. For example, each of the right and left rear wheels 156 may be coupled to a respective drive axle of the right and left drive units 152. Each of the drive units 152 may be selectively operable to rotate its drive axle and attached rear wheel 156 forward or backward (e.g., forward or backward about a rotational axis 166 of the drive axle and the wheel 156 that is oriented transverse to the longitudinal axis 157 of the mower 100) (see, e.g., FIGS. 1B and 2). The rear wheels 156 may be referred to as "driven" or "drive" wheels in that they receive (and are driven into rotation by) motive power intended to propel the mower 100.

In some embodiments, each of the drive units 152 is a hydraulic drive unit. For example, each of the drive units 152 may include a hydraulic pump (or "pump") 160 and a hydraulic motor (or "motor") 162 (see, e.g., FIG. 2). The pump 160 may operate to circulate hydraulic fluid that drives the motor 162, which drives rotation of a drive axle 164 of the drive unit 152 (see, e.g., FIGS. 2 and 3). In some embodiments, the pump 160 includes a pump input pulley that is rotated by the circulation of the pump belt. The rotation of the pump input pulley may provide the motive power to pressurize and circulate the hydraulic fluid that drives the motor 162 and rotation of the drive axle 164.

Figure 2:
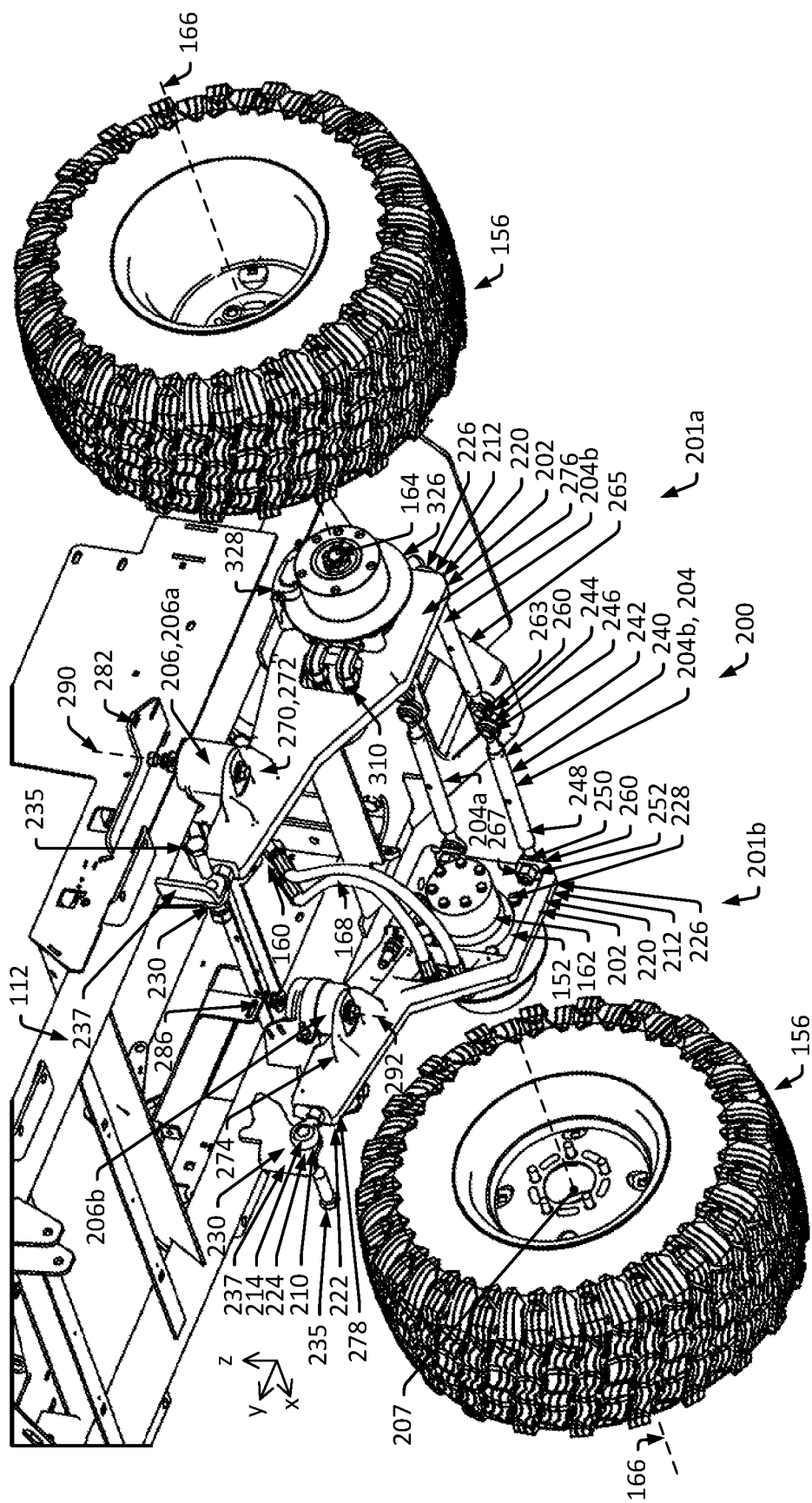
FIG. 2 is a diagram that illustrates a front-underside perspective view of a mower system having a trailing arm suspension system in accordance with one or more embodiments.
Figure 3:
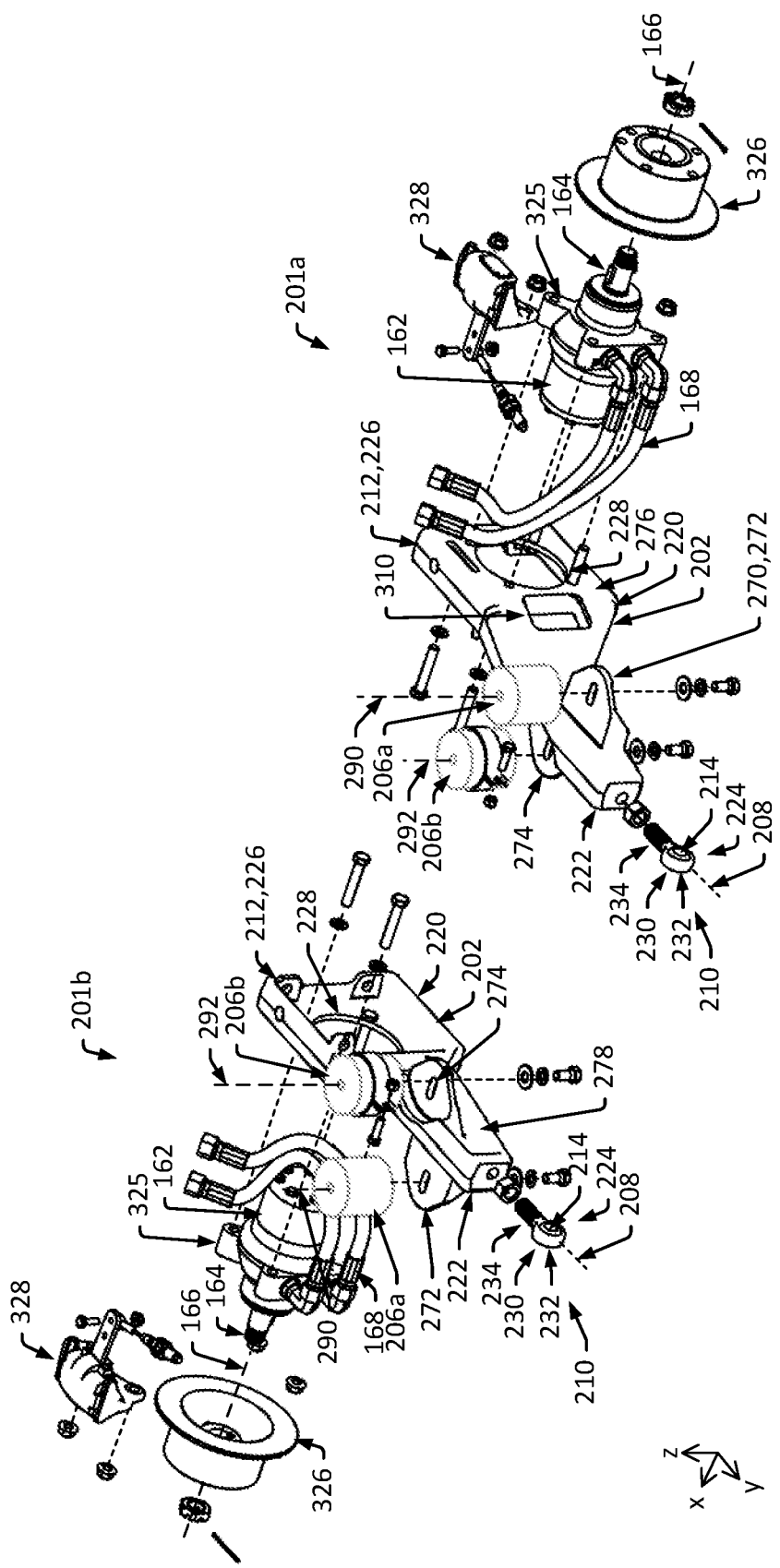
FIG. 3 is a diagram that illustrates an exploded front-top perspective view of components of a mower trailing arm suspension system (and related components) in accordance with one or more embodiments.

In some embodiments, each of the drive units 152 transmits motive power to rotate its drive axle 164 in response to selective operation of associated control handles (or "levers") 158 (see, e.g., FIGS. 1 and 2). For example, when a control handle 158 of a drive unit 152 is pushed forward or backward, the drive axle 164 of the drive unit 152 (and an attached rear wheel 156) may be rotated forward or backward, respectively, about the rotational axis 166 of the drive axle 164 (and of an attached rear wheel 156). The rotational axis 166 may be transverse to the longitudinal axis 157 of the mower 100. For example, the rotational axis 166 may be oriented in the range of about 80-100 degrees)(° relative to the longitudinal axis 157 of the mower 100 such that it is substantially perpendicular (or "orthogonal") to the longitudinal axis 157 of the mower 100. An operator of the mower 100 may, for example, simultaneously push both of the right and left control handles 158 about the same distance forward to drive the mower 100 forward or may vary the distance of the control handles 158 to turn the mower 100.

In some embodiments, the drive system 108 includes a pump and motor system having the pump 160 located remote from the motor 162. For example, each of the drive units 152 may include a pump 160 coupled to the frame weldment 112, a motor 162 coupled to a trailing arm (e.g., trailing arm 202) of the suspension system 200, and flexible hydraulic hoses 168 that fluidly couple the pump 160 and the motor 162. During operation of the drive system 108, hydraulic fluid may be routed between the pump 160 and the motor 162 by way of the hydraulic hoses 168. Although certain embodiments are described with regard to "remote" drive units 152 that include a "remote" hydraulic pump, embodiments may employ "integrated" drive units 152 that include the pump 160 and the motor 162 integrated into a single unit. For example, each of the drive units 152 may be an integrated hydrostatic (or "hydraulic") transaxle (also referred to as an "integrated transaxle" or "transaxle"). A transaxle may include a hydraulic pump, a hydraulic motor, and a drive axle integrated together in a single unit. For example, the hydraulic pump, the hydraulic motor, and the drive axle may be rigidly coupled to one another (e.g., by way of a single unitary housing) such that they move together in unison. In such an embodiment, the transaxles may, for example, be coupled to the trailing arms (e.g., coupled to the trailing arms 202 of the suspension system 200 described here) to place the drive axles of the transaxles in locations and orientations that are the same or similar to that of the drive axles 164 shown and described here with regard to the drive units 152 that each include a remote hydraulic pump 160.

In some embodiments, the cutting system 110 includes components that provide for cutting (or "mowing") of grass. In some embodiments, the cutting system 110 includes a mowing deck system (or "deck system") 170. The mowing deck system 170 may include a mowing deck (or "deck") 172 that houses one or more cutting blades (or "blades") 174. During operation of the mower 100, the blades 174 may be rotated to cut (or "mow") grass under the deck 172 as the mower 100 traverses the ground. The deck 172 may be, for example, a metal housing that shields the operator and components of the mower 100 from debris, such as flying grass, dust or rocks, that is generated by the rotating blades 174. In some embodiments, the mowing blades 174 are coupled to respective spindle assemblies (or "spindles") which are coupled to the deck 172. Each of the spindles may include a spindle housing, a spindle shaft and a spindle pulley. A blade 174 may be coupled (e.g., bolted or similarly fastened) to a lower end of the spindle shaft that terminates under the deck 172 such that the blade 174 is suspended under the deck 172. Rotation of the spindle pulley may cause a corresponding rotation of the spindle shaft and the blade 174. The spindle pulley may be rotated, for example, by circulation of the deck drive belt. In some embodiments, the cutting system 110 includes multiple blades 174 and associated spindles. For example, the deck system 170 may include left, center and right blades 174 coupled to left, center and right spindles, respectively.

In some embodiments, the trailing arm independent rear suspension system (or "suspension system") 200 is operable to dampen jarring and vibrations of the mower 100. For example, the suspension system 200 may regulate movement of the rear wheels 156 relative to the frame 102 and other components of the mower 100 to dampen jarring and vibrations associated with impacts to the rear wheels 156 of the mower 100. In some embodiments, the suspension system 200 includes a left trailing arm suspension system 201a and a right trailing arm suspension system 201b. The left and right trailing arm suspension systems 201a and 201b may be "independent" in that they regulate movement of respective ones of the left and right rear wheels 156 of the mower 100 independent of the other. For example, each of the left and right trailing arm suspension systems 201a and 201b may provide for "upward" and "rearward" movement of the respective left and right rear wheels 156, which may dampen jarring and vibrations associated with the rear wheels 156 of the mower 100. This may include, for example, jarring and vibrations that may otherwise occur when one of the rear wheels 156 impacts an impediment, such as a rock, as the mower 100 traverses terrain. In some embodiments, the left and right trailing arm suspension systems 201a and 201b include the same or similar arrangements of components. For example, the left and right trailing arm suspension systems 201a and 201b may be "mirror images" of one another (e.g., mirrored horizontally across the longitudinal axis 157 of the mower 100). Accordingly, although certain embodiments are described with regard to one of the left or the right trailing arm suspension systems 201a and 201b for the purpose of illustration, the other of the left and right trailing arm suspension systems 201a and 201b may have similar features.

In some embodiments, each of the left and right trailing arm suspension systems 201a and 201b includes a longitudinal control arm (or "trailing arm") 202, lateral control arms (or "control arms") 204, and resilient members 206.

Figure 4A:
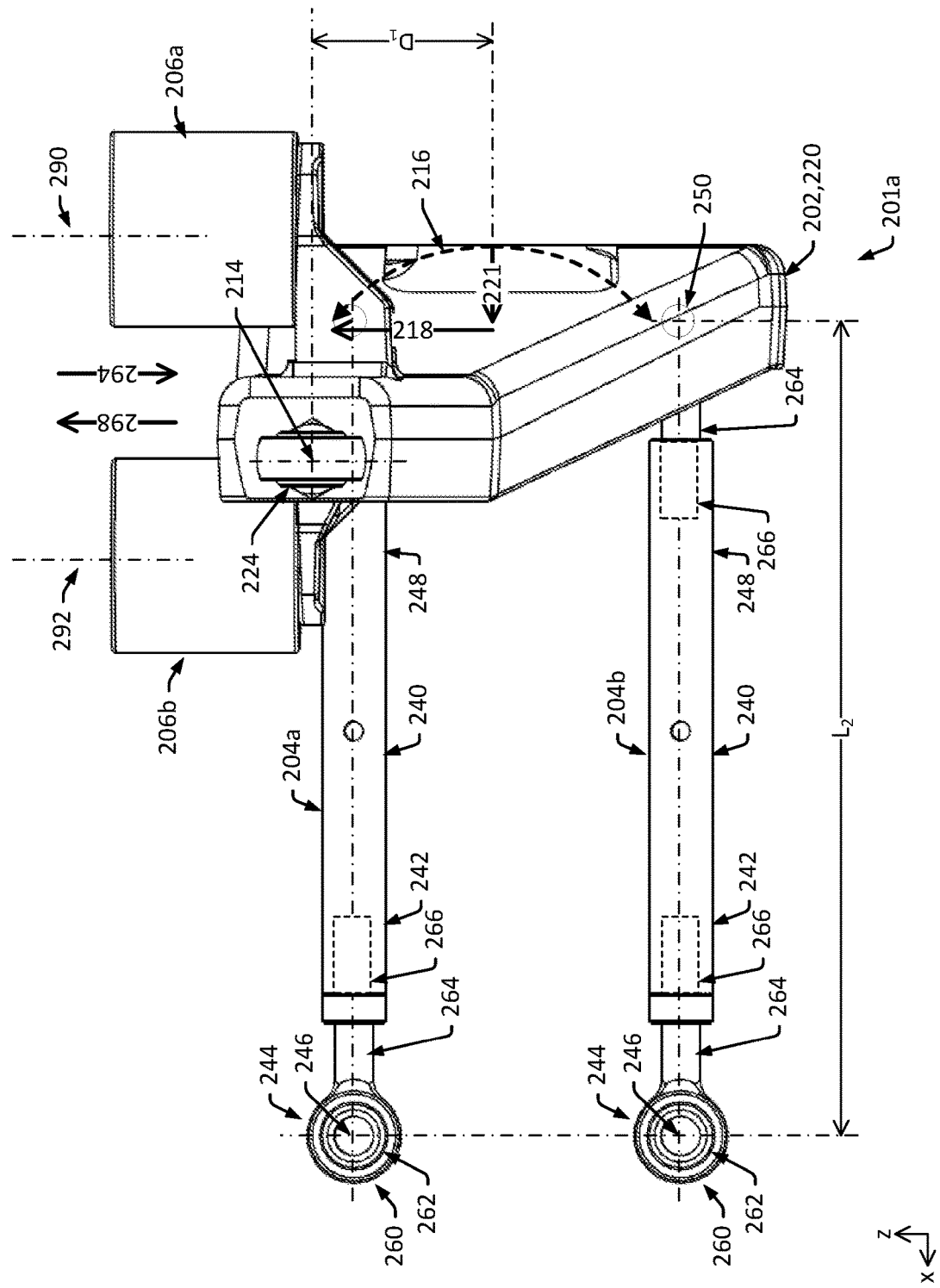
FIGS. 4A-4F are diagrams that illustrate front, back/rear, outside, inside, top and bottom views of components of a mower trailing arm suspension system in accordance with one or more embodiments.
Figure 4B:
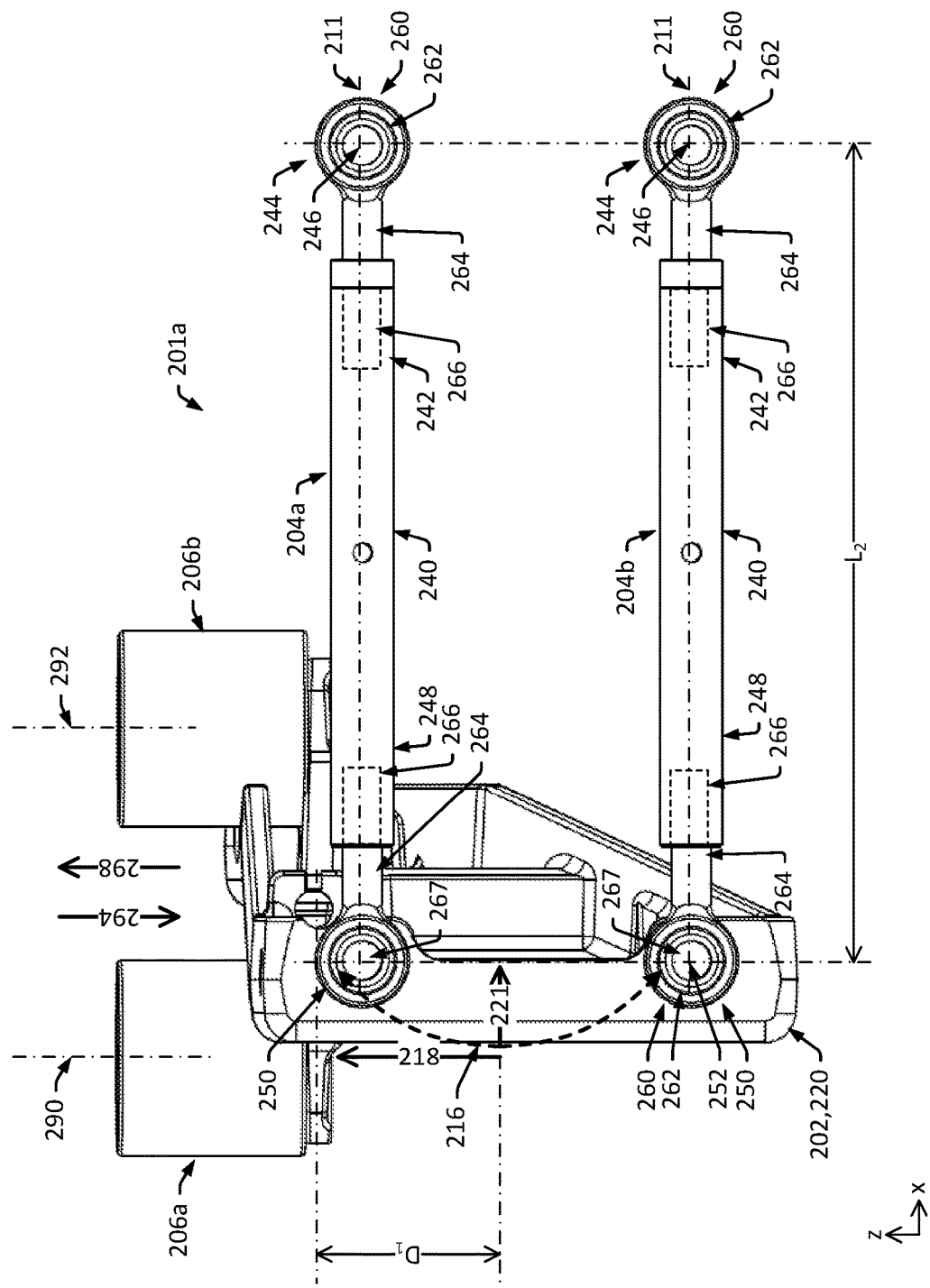

The trailing arm 202 may regulate longitudinal positioning and movement of the rear wheel 156 and the motor 162 coupled to the trailing arm 202. The trailing arm 202 may be an elongated member that is oriented substantially parallel to the longitudinal axis 157 of the mower 100 and may have a front (or "leading") end 210 that is pivotally coupled to the frame 102 and a "rear" (or "trailing") end 212 that supports the motor 162 (and the associated rear wheel 156). For example, the trailing arm 202 may have a longitudinal axis 208 (see, e.g., FIGS. 4E and 4F) that is oriented within about 10 degrees of the orientation of the longitudinal axis 157 of the mower 100 (e.g., within about 10 degrees of the orientation of the y-z plane). The pivotal coupling of the leading end 210 to the frame 102 may define a pivot location 214 about which the trailing arm 202 pivots. The trailing arm 202 may be biased by resilient members 206 into a position in which the rotational center 207 of the rear wheel 156 (e.g., defined by a point at which the rotational axis 166 of the rear wheel 156 passes through the center of the rear wheel 156, which may be at or near the location where the axle 164 couples the wheel 156) is vertically offset below (e.g., in the negative z-direction from) the pivot location 214 by a given distance ($D_1$) (see, e.g., FIGS. 1B, 2, 4A and 4C). The distance ($D_1$) may be, for example, in the range of about 0-10 in. For example, the distance ($D_1$) may be about 5 in. In some embodiments, the rotational center 207 of the rear wheel 156 (or the rotational axis 166) is longitudinally offset (in the y direction) from the pivot location 214 of the lead end joint 224 of the trailing arm 202 by a given distance ($D_2$). The distance ($D_2$) may be, for example, in the range of about 10-30 in. For example, the distance ($D_2$) may be about 20 in.

Figure 4C:
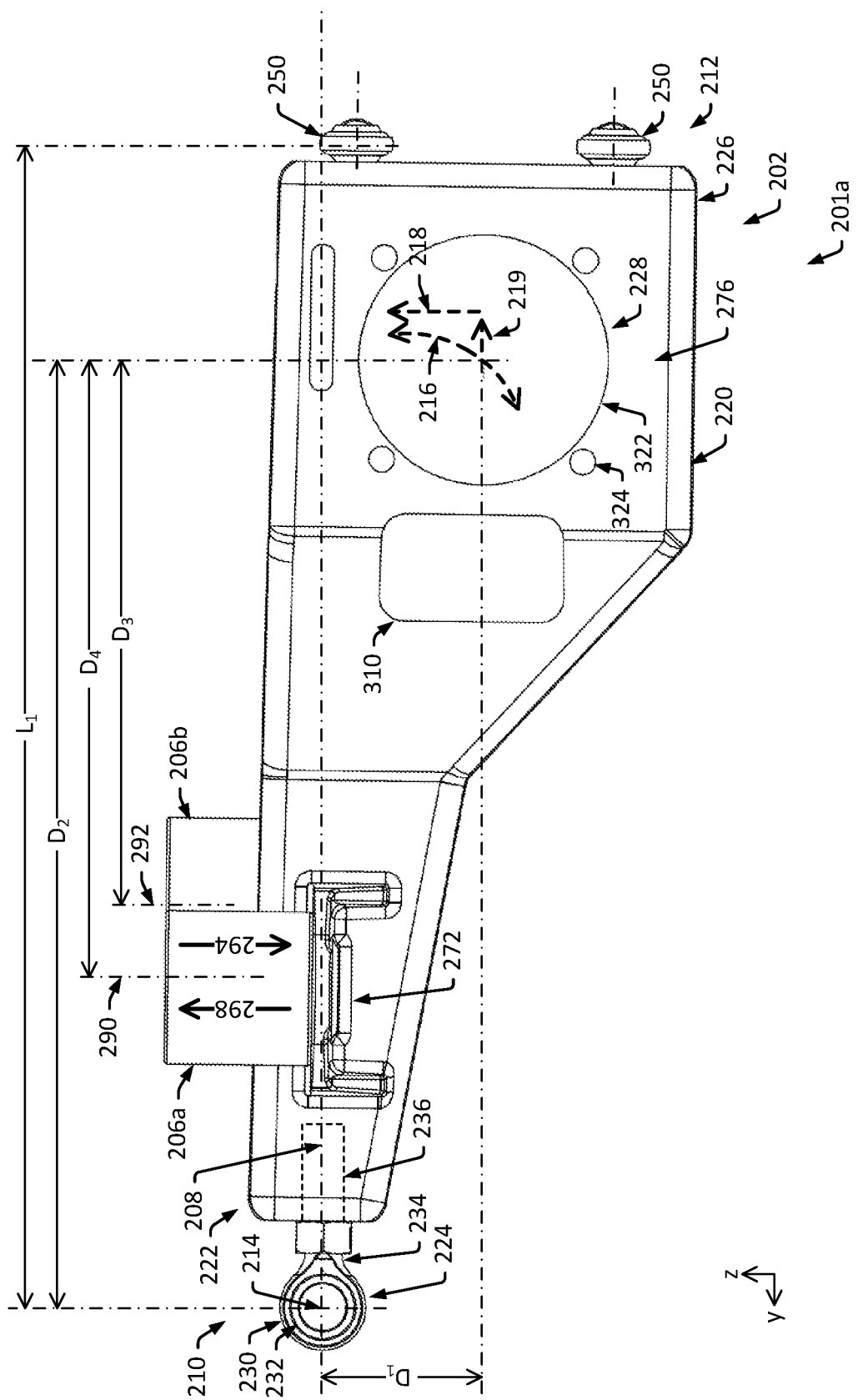

The trailing arm 202 may guide the rear wheel 156 and the motor 162 upward along an arc path (e.g., as represented by arrow 216 of FIGS. 4A, 4B and 4C) (e.g., when the mower 100 is moving forward across the ground and the rear wheel 156 encounters an impediment that urges the rear wheel 156 upward) such that the rear wheel 156 and motor 162 move upward (e.g., vertically in the positive z-direction, as represented by arrow 218 of FIG. 4C) and rearward (e.g., longitudinally in the negative y-direction, as represented by arrow 219 of FIG. 4C) relative to the frame 102 and other components of the mower 100. Such a combination of upward and rearward movement may, for example, dampen the jarring and vibration associated with an impact of the rear wheel 156 with an impediment. For example, the upward movement of the rear wheel 156 (e.g., as represented by arrow 218 of FIG. 4C) may absorb the vertical element of the impulse of the impact and the rearward movement of the rear wheel 156 (e.g., as represented by arrow 219 of FIG. 4C) may absorb the horizontal element of the impulse of the impact.

Figure 4D:
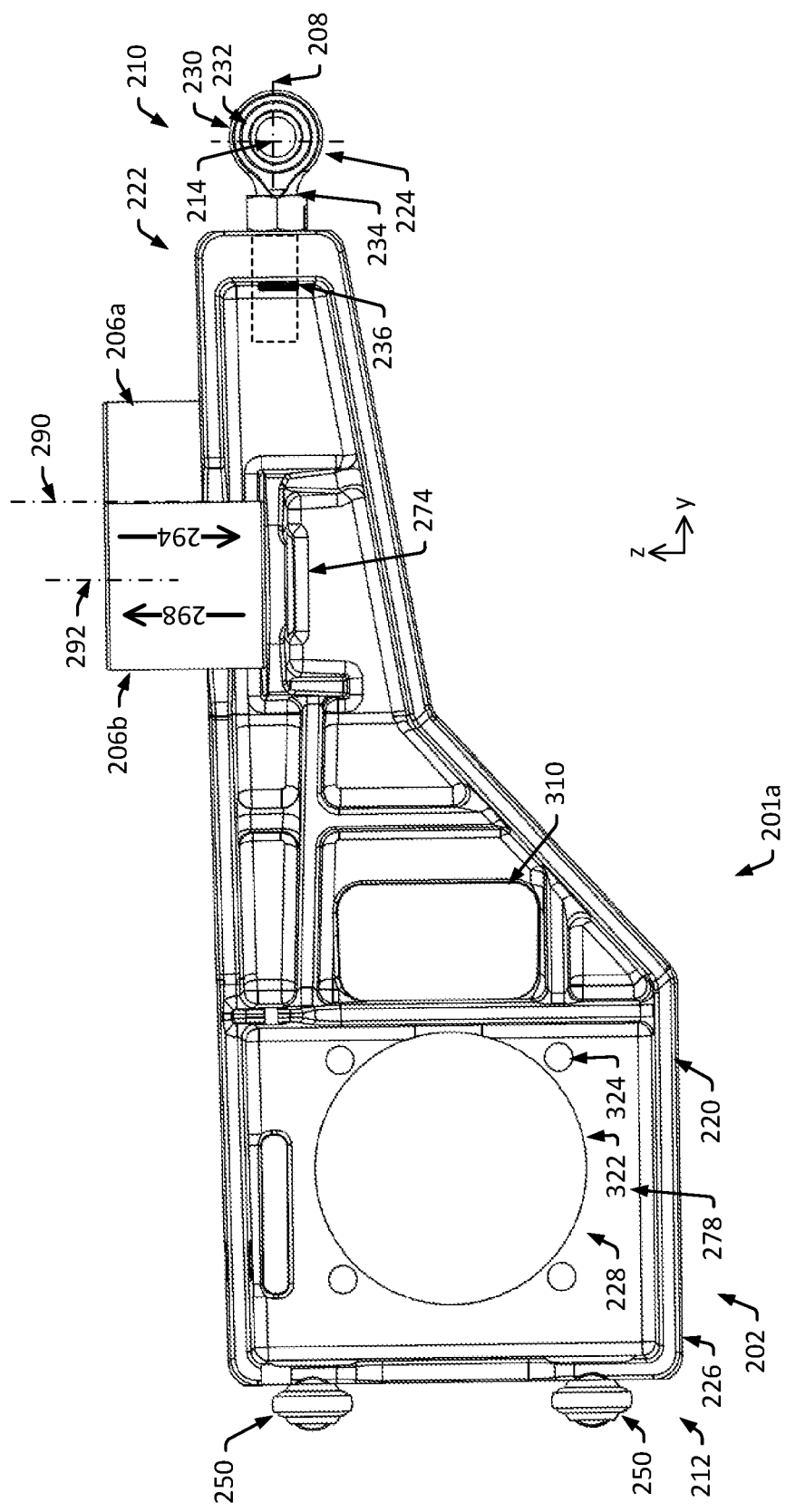
Figure 4E:
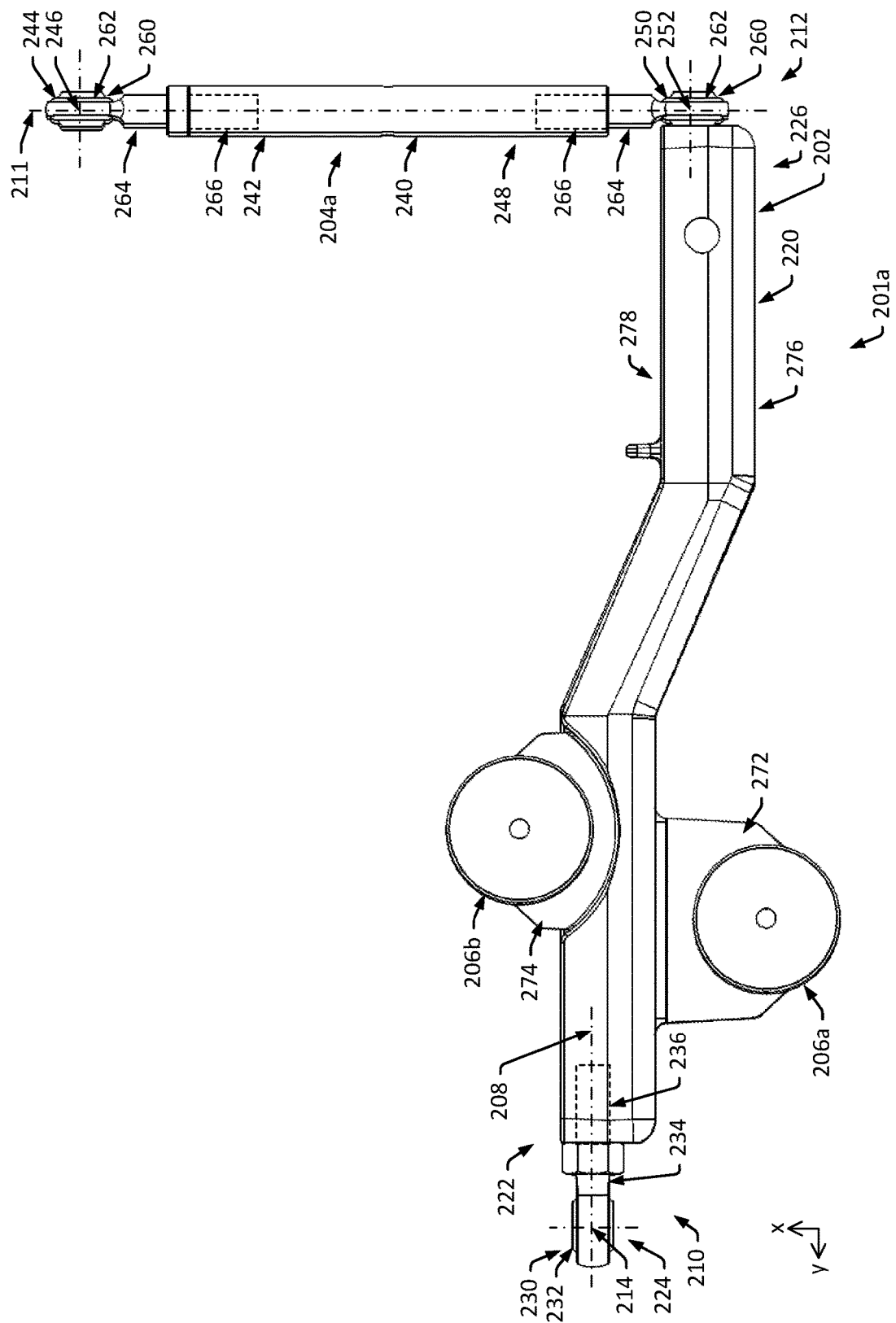
Figure 4F:
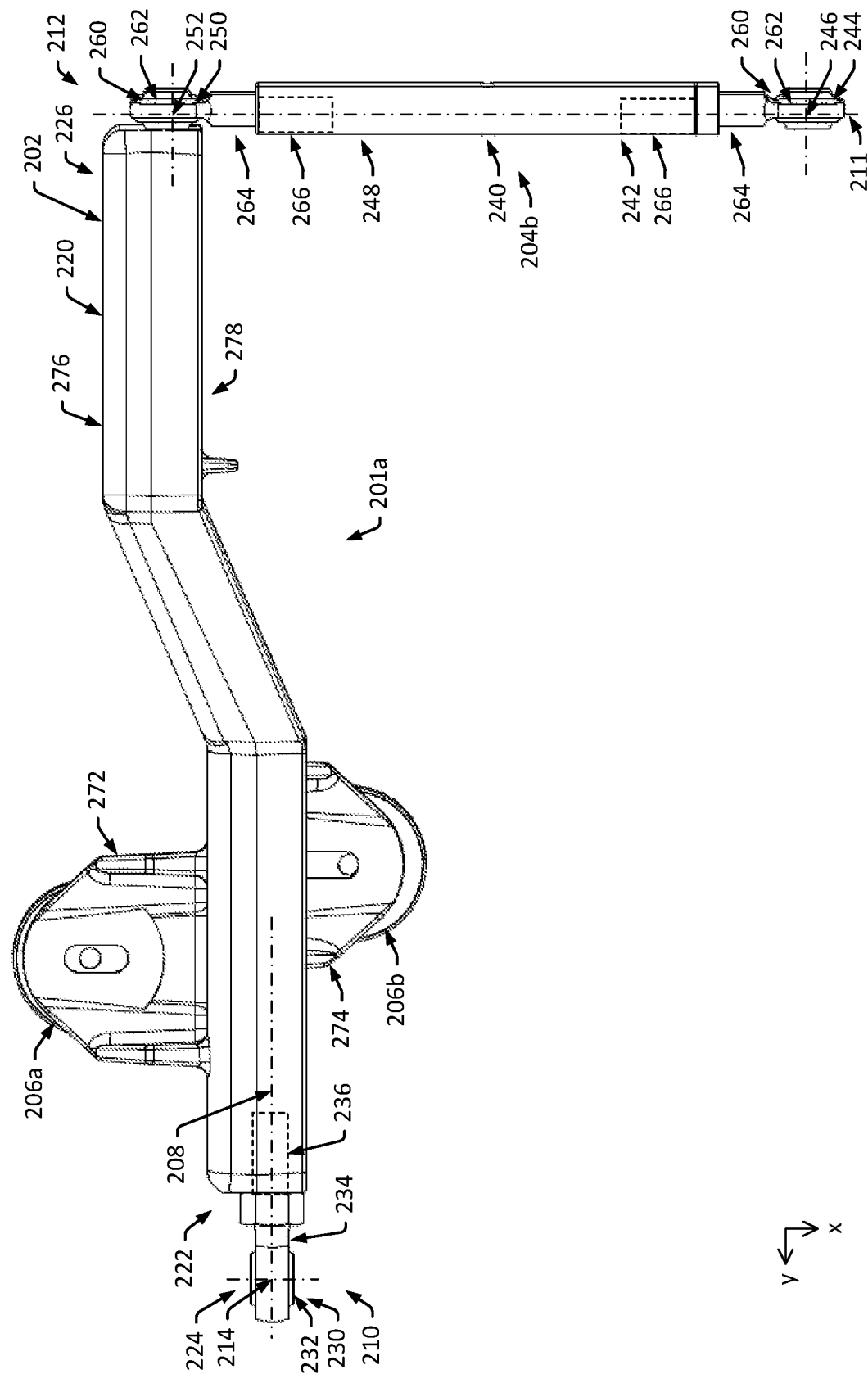
Figure 5A:
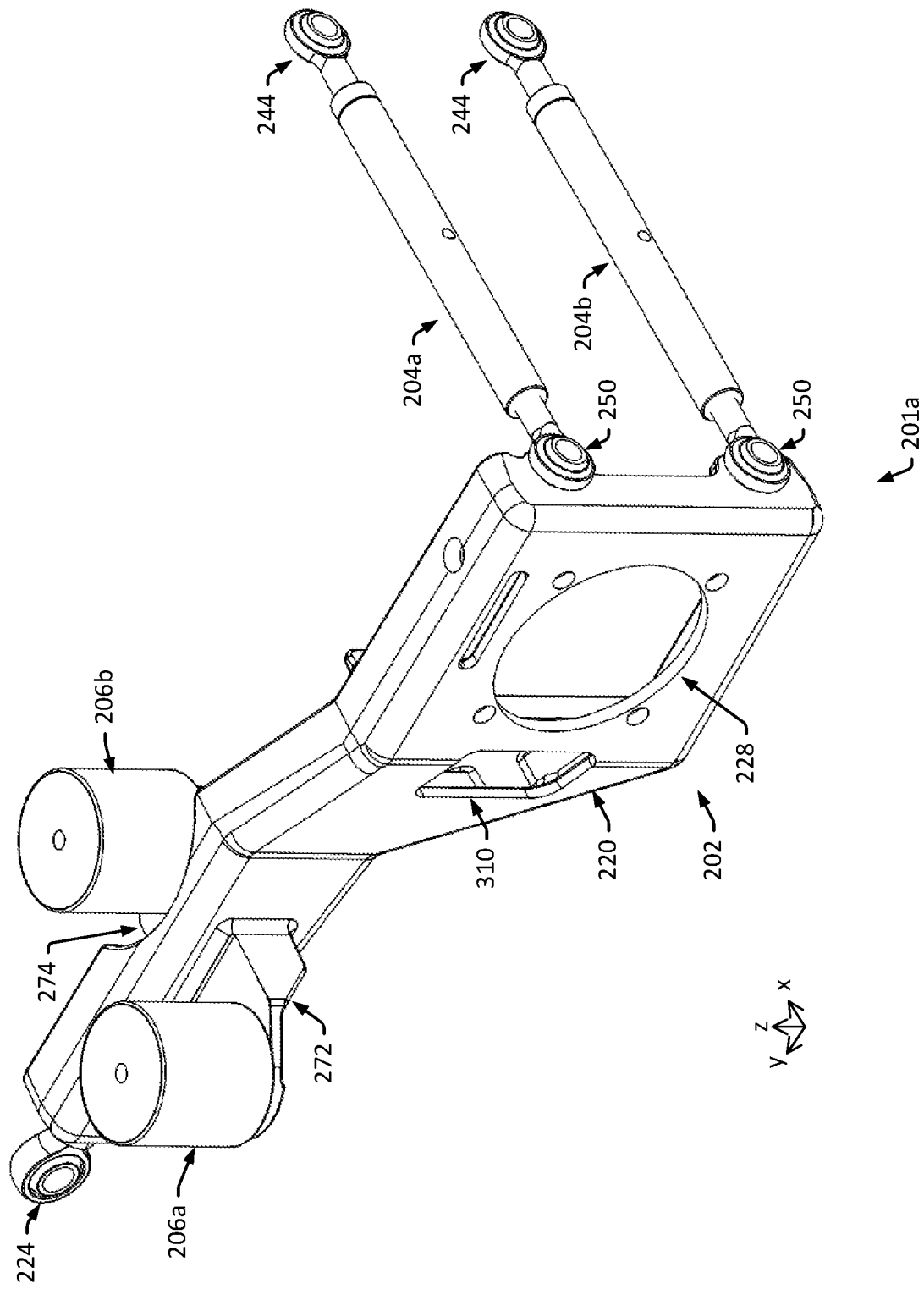
FIGS. 5A-5D are diagrams that illustrate perspective views of components of a mower trailing arm suspension system (and related components) in accordance with one or more embodiments.
Figure 5B:
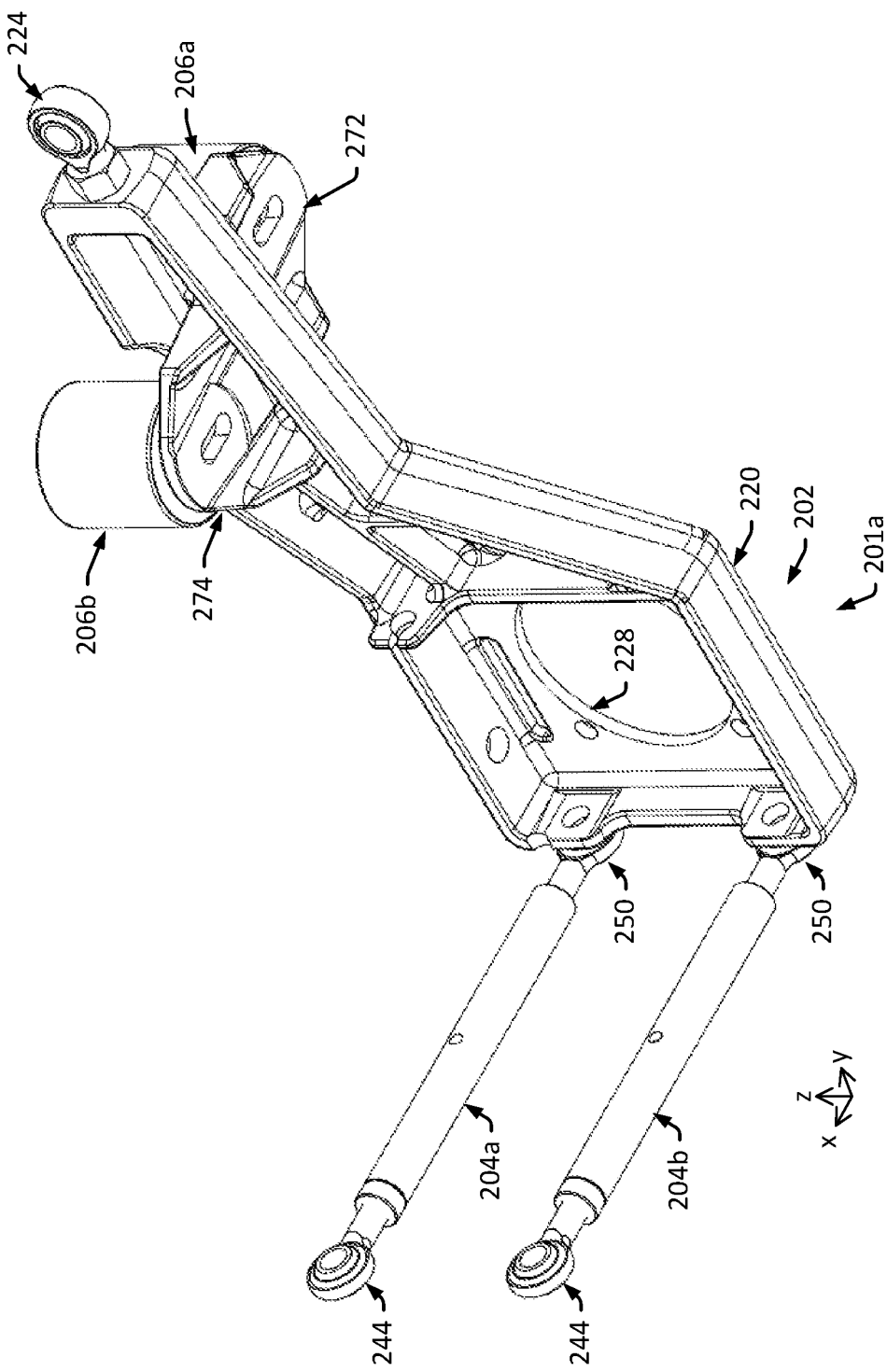
Figure 5C:
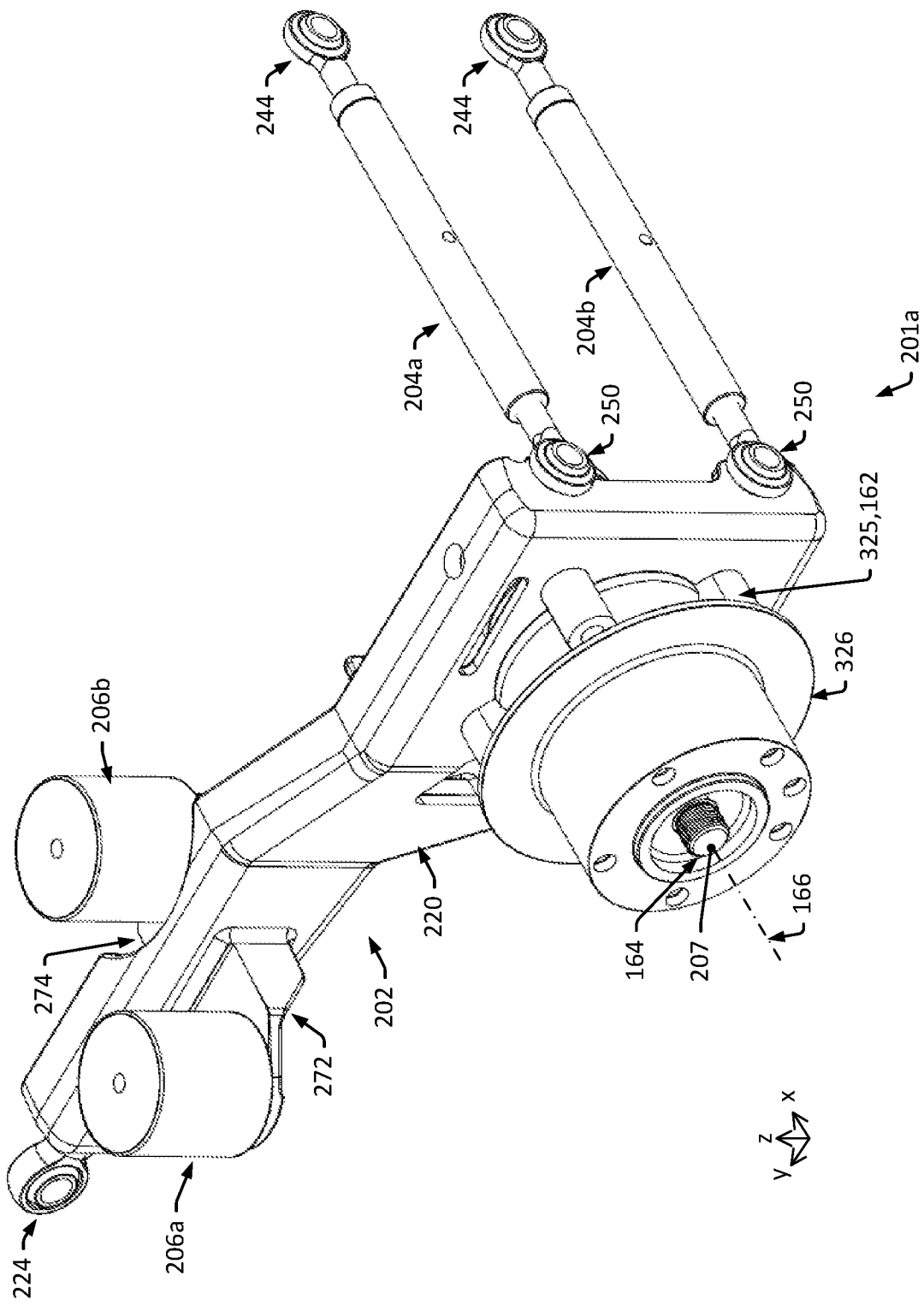
Figure 5D:
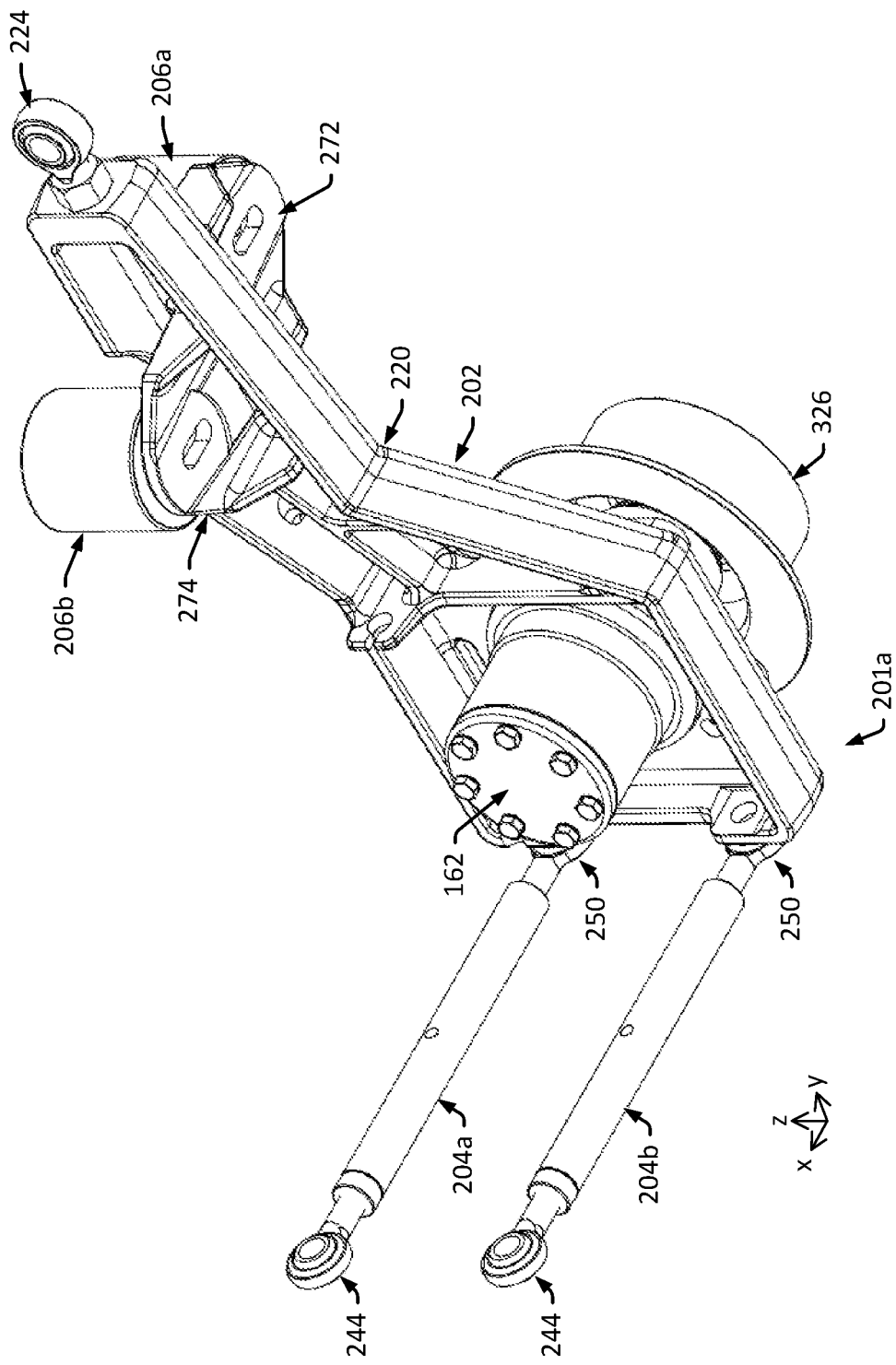

The lateral control arms 204 of each of the left and right trailing arm suspension systems 201a and 201b may regulate lateral positioning and movement of the trailing arm 202 (and the rear wheel 156 and the motor 162 coupled to the trailing arm 202). The lateral control arms 204 for each of the left and right trailing arm suspension systems 201a and 201b may include a pair of elongated members that are oriented parallel to one another and substantially transverse to the longitudinal axis 157 of the mower 100. For example, the lateral control arms 204 may include an upper (or "top") lateral control arm 204a and a lower (or "bottom") lateral control arm 204b that is vertically offset below the upper lateral control arm 204a (see, e.g., FIG. 4D). Each of the lateral control arms 204a and 204b may have a longitudinal axis 211 (see, e.g., FIGS. 4E and 4F) that is oriented transverse to the orientation of the longitudinal axis 157 of the mower 100. The longitudinal axes 211 may be substantially perpendicular to the longitudinal axis 157 of the mower 100. For example, the longitudinal axes 211 may be within about 10 degrees of perpendicular to the orientation of the longitudinal axis 157 of the mower 100. In some embodiments, the lateral control arms 204a and 204b are vertically aligned with one another such that the longitudinal axis 211 of the lateral control arm 204a is located directly above the longitudinal axis 211 of the lateral control arm 204b. A proximal (or "inside") end of each of the lateral control arms 204a and 204b may be pivotally coupled to the frame 102 and a distal (or "outside") end of each of the lateral control arms 204a and 204b may be pivotally coupled to the trailing end 212 of the trailing arm 202.

In some embodiments, one or both of the lateral control arms 204a and 204b have adjustable lengths. The ability to adjust the length of the lateral control arms 204 may enable fine tuning of the position, orientation or movement of the trailing arm 202 (and the rear wheel 156 and the motor 162 coupled to the trailing arm 202). For example, the length of one or both of the lateral control arms 204a and 204b may be adjusted to adjust the "toe" and "camber" of the trailing arm 202 (and of the rear wheel 156 and the motor 162 coupled to the trailing arm 202). For example, increasing/decreasing the length of the upper lateral control arms 204a (or decreasing/increasing the length of the lower lateral control arm 204b) may increase/decrease the camber angle of the trailing arm 202 (and of the rear wheel 156 and the motor 162 coupled to the trailing arm 202). As another example, increasing/decreasing the length of the upper and lower lateral control arms 204a and 204b may increase/decrease the toe-in angle of the trailing arm 202 (and of the rear wheel 156 and the motor 162 coupled to the trailing arm 202).

Figure 6A:
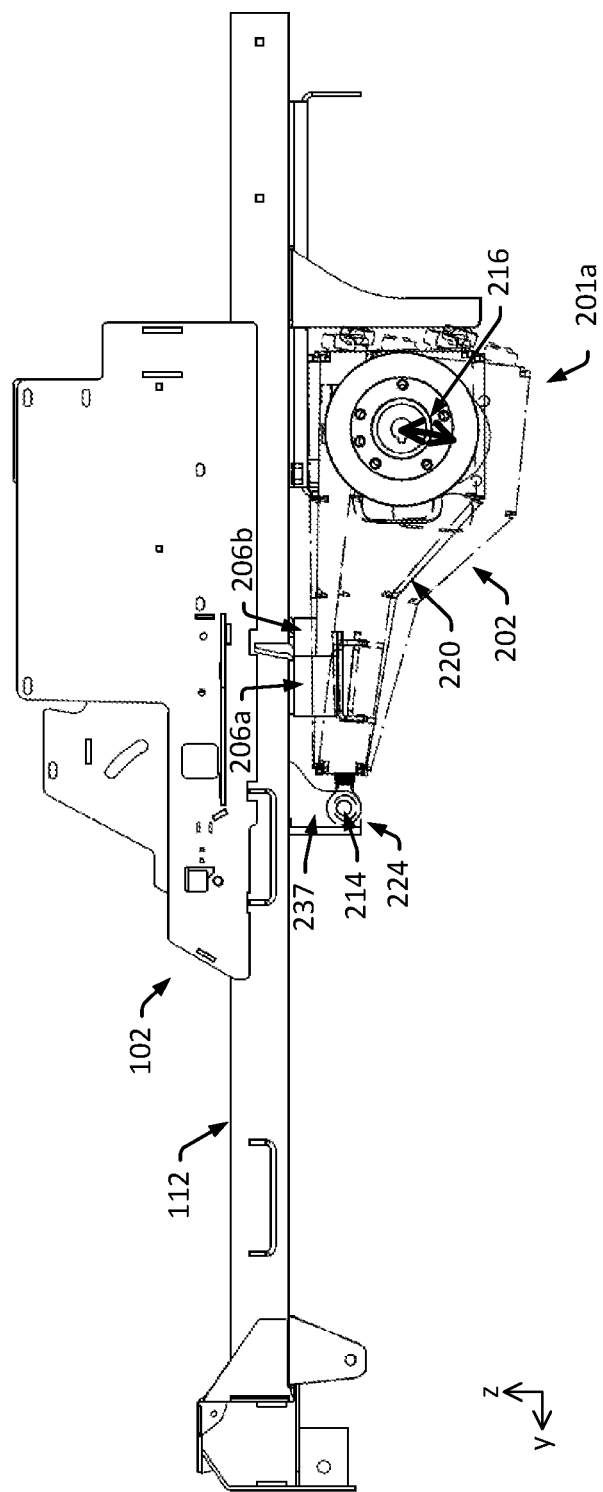
FIG. 6A is a side view of a mower system that illustrates movement of components of a mower trailing arm suspension system (and related components) in accordance with one or more embodiments.

In some embodiments, the pivoting motion of the lateral control arms 204a and 204b imparts lateral (or "sideways") movement and pivoting of the trailing arm 202 (and the rear wheel 156 and the motor 162 coupled to the trailing arm 202). For example, as the trailing arm 202 (and the rear wheel 156 and the motor 162 coupled to the trailing arm 202) move upward (e.g., as represented by the arrow 218 of FIG. 4C), the movement along the arced path (represented by arrow 216 of FIG. 4C) may include a horizontal/lateral element of movement (e.g., as represented by arrow 221 of FIGS. 4A and 4B). In some embodiments, the lateral control arms 204a and 204b guide the trailing arm 202 through "multi-axis" pivoting about the pivot location 214. For example, as the trailing arm 202 pivots vertically about the pivot location 214 (e.g., rotating about an axis parallel to the x-axis and running through the pivot location 214) it may also pivot horizontally about the pivot location 214 (e.g., rotating about an axis parallel to the z-axis and running through the pivot location 214). Accordingly, in some embodiments, each of the left and right trailing arm suspension systems 201a and 201b may provide for the trailing end 212 of the trailing arm 202 (and the rear wheel 156 and the motor 162 coupled to the trailing arm 202) moving "upward," "rearward" and "inward" in response to the rear wheel 156 being urged upward relative to the frame 102. For example, referring to FIG. 6B, in an embodiment in which the trailing arm 202 is biased/supported by the resilient members 206 such that in its "normal" position (e.g., the position (A) in which it supports the weight of the mower system 100), the control arms 204 are oriented generally parallel (e.g., such that the "inside" end of the lateral control arms 204 that is coupled to the frame 102 is located about level with the "outside" end of the lateral control arms 204 that is coupled to the trailing arm 202), the trailing end 212 of the trailing arm 202 (and the rear wheel 156 and the motor 162 coupled to the trailing arm 202) will move upward, backward and inward with the upward vertical movement of the rear wheel 156.

In some embodiments, the trailing arm 202 includes a trailing arm body 220. The trailing arm body 220 may include an elongated member that is oriented substantially parallel to the longitudinal axis 157 of the mower 100. For example, the trailing arm body 220 may have a longitudinal axis 208 (see, e.g., FIGS. 4E and 4F) that is oriented within about 15 degrees of the orientation of the longitudinal axis 157 of the mower 100 (e.g., within about 10 degrees of the orientation of the y-z plane). A front (or "leading") end 222 (or "nose") of the trailing arm body 220 may be pivotally coupled to the frame 102 by way of a trailing arm leading end joint (or "lead end joint") 224. A rear (or "trailing") end 226 of the trailing arm body 220 may have a trailing arm drive unit mount (or "drive unit mount") 228 that supports the motor 162 of the drive unit 152 (and the rear wheel 156 coupled to the motor 162 of the drive unit 152).

In some embodiments, the lead end joint 224 enables multi-axis pivoting of the trailing arm 202 about the pivot location 214. For example, lead end joint 224 may include a spherical rod end 230. The spherical rod end 230 may include a spherical joint (or "ball joint") 232 (see, e.g., FIG. 4C). The spherical joint 232 may include a spherical bearing that permits angular rotation about a central point in two orthogonal directions. In some embodiments, the spherical joint 232 couples to a complementary member of the frame 102. For example, the spherical joint 232 may have a cylindrical opening that is coupled to a stud (e.g., a bolt) 235 that extends from a trailing arm member 237 that extends downward from the frame weldment 112 of the mower 100. The spherical joint 232 may enable the trailing arm 202 to pivot in multiple dimensions (e.g., in three-dimensions) about the pivot location 214. For example, spherical joint 232 may enable the trailing arm 202 to pivot about a central point (e.g., about pivot location 214) in two orthogonal directions. This can include rotation about an x axis, a y axis and a z axis that pass through the center of the spherical joint 232. Pivoting about the x axis may include pivoting movement in the y-z plane that passes through the center of the spherical joint 232, pivoting about the y axis may include pivoting movement in the x-z plane that passes through the center of the spherical joint 232, and pivoting about the z axis may include pivoting movement in the x-y plane that passes through the center of the spherical joint 232. This may enable the trailing end 212 of the trailing arm 202 (e.g., defined by the trailing end 226 of the trailing arm body 220) to rotate vertically and laterally, relative to the frame, along the arced path having x, y and z components (e.g., as represented by arrow 216 of FIGS. 4A, 4B, 4C, 6A and 6B).

In some embodiments, the lead end joint 224 provides for adjustment of the "length" ($L_1$) and the longitudinal offset distance ($D_2$) of the trailing arm 202. For example, the spherical rod end 230 may be an adjustable spherical rod end that includes the spherical joint (or "ball joint") 232 at one end and a threaded stud 234 at the opposite end (see, e.g., FIGS. 3, 4C and 4D). The stud 234 of the spherical rod end 230 may be, for example, a threaded stud having a male thread that threads into a complementary female threaded hole 236 in the leading end 222 of the trailing arm body 220. The threading of the stud 234 into the hole 236 may enable adjustment of the length ($L_1$) and the longitudinal offset distance ($D_2$) of the trailing arm 202. For example, the stud 234 may be threaded relatively deep into the hole 236 to provide a relatively short length ($L_1$) and longitudinal offset distance ($D_2$). The stud 234 may be threaded relatively shallow into the hole 236 to provide a relatively long length ($L_1$) and longitudinal offset distance ($D_2$). The spherical rod end 230 may also include a jam nut that is threaded onto the threaded stud 234 and that can be tighten against the trailing arm body 220 to secure the position the ball joint 232 and fix the length ($L_1$) and the longitudinal offset distance ($D_2$) of the trailing arm 202.

In some embodiments, each of the lateral control arms 204a and 204b includes a cylindrical elongated control arm body (or "control arm rod") 240 (see, e.g., FIGS. 2, 4A, 4B, 4E-4D and 5A-5D). A proximal ("inside") end 242 of each control arm rod 240 may be pivotally coupled to the frame 102 by way of a proximal end joint (or "inside end joint") 244. The inside end joint 244 may define a corresponding proximal (or "inside") pivot location 246. A distal (or "outside") end 248 of each control arm rod 240 may be pivotally coupled to the trailing end 212 of the trailing arm body 220 by way of a distal end joint ("outside end joint") 250. The outside end joint 250 may define a distal ("outside") pivot location 252.

In some embodiments, the inside end joint 244 enables pivoting of the control arm rod 240 in multiple directions about the inside pivot location 246. In some embodiments, the outside end joint 250 enables pivoting of the control arm rod 240 in multiple directions about the outside pivot location 252. For example, each of the inside end joint 244 and the outside end joint 250 may include a spherical rod end 260. The spherical rod end 260 may include a spherical joint (or "ball joint") 262 (see, e.g., FIGS. 4A, 4B, 4E-4D). The spherical joint 262 may include a spherical bearing that permits angular rotation about a central point (e.g., about pivot location 246) in two orthogonal directions. In some embodiments, the spherical joint 262 couples to a complementary member of the frame 102 or the trailing end 212 of the trailing arm body 220. For example, with regard to the inside end joint 244, the spherical joint 262 may have a cylindrical opening that is coupled to a stud 263 (e.g., a bolt) that extends from a control arm support member 265 that extends downward from the frame weldment 112 of the mower 100 (see, e.g., FIG. 2). With regard to the outside end joint 250, the spherical joint 262 may have a cylindrical opening that is coupled to a stud 267 (e.g., a bolt) that extends from the trailing end 212 of the trailing arm body 220 (see, e.g., FIG. 4B). Each of the spherical joints 262 may enable the control arm 204 to pivot in three dimensions about its respective pivot location 246 or 252 defined by the joint 262. For example, each spherical joint 262 may enable the control arm 204 to pivot about a central point (e.g., about pivot location 246 or 252) in two orthogonal directions. This can include rotation about an x axis, a y axis and a z axis that pass through the center of the spherical joint 262. Pivoting about the x axis may include pivoting movement in the y-z plane that passes through the center of the spherical joint 262, pivoting about the y axis may include pivoting movement in the x-z plane that passes through the center of the spherical joint 262, and pivoting about the z axis may include pivoting movement in the x-y plane that passes through the center of the spherical joint 262. This may enable the control arm 204 to rotate vertically and sideways along the arced path (e.g., as represented by arrow 216 of FIGS. 4A, 4B, 4C, 6A and 6B).

In some embodiments, one or both of the inside end joint 244 and the outside end joint 250 provides for adjustment of the "length" ($L_2$) of the control arm 204 (see, e.g., FIGS. 4A and 4B). For example, the spherical rod ends 260 may be adjustable spherical rod ends that each includes a spherical joint (or "ball joint") 262 at one end and a threaded stud 264 at the opposite end (see, e.g., FIGS. 4A, 4B, 4E and 4F). The stud 264 of the rod end 260 may be, for example, a threaded stud having a male thread that threads into a complementary female threaded hole 266 in the corresponding end of the control arm rod 240 (e.g., the inside end 242 or outside end 248 of the control arm rod 240). The threading of the stud 234 into the hole 266 may enable adjustment of the length ($L_2$) of the trailing arm 202. For example, the stud 234 may be threaded relatively deep into the hole 266 to provide a relatively short length ($L_2$), or the stud 234 may be threaded relatively shallow into the hole 266 to provide a relatively long length ($L_2$). The spherical rod end 260 may also include a jam nut on the threaded stud 264 that can be tighten against the control arm rod 240 to secure the position of the ball joint 262 and fix the length ($L_2$) of the trailing arm 202.

In some embodiments, the trailing arm body 220 includes perches 270. The perches 270 may provide support for the resilient members 206. For example, each of the trailing arm bodies 220 may include an outside perch 272 and an inside perch 274. The outside perch 272 may include a horizontally oriented platform that extends laterally from an outer side/face 276 of the trailing arm body 220, and the inside perch 274 may include a horizontally oriented platform that extends laterally from an opposite/inner side/face 278 of the trailing arm body 220. The outside perch 272 may support an associated "outside" resilient member 206a that is disposed (or "sandwiched") between an upper surface of the outside perch 272 and a complementary surface of an "outside" support member 282 of the frame 102 (see, e.g., FIG. 2). The inside perch 274 may support an "inside" resilient member 206b that is disposed (or "sandwiched") between an upper surface of the inside perch 274 and a complementary surface of an "inside" support member 286 of the frame 102 (see, e.g., FIG. 2).

In some embodiments, the outside perch 272 and the outside resilient member 206a are positioned such that a longitudinal axis 290 of the outside resilient member 206a is longitudinally offset forward of the rotational axis 166 of the rear wheel 156 (and of the drive axle 164 of the motor 162) by a given distance ($D_3$) (see, e.g., FIG. 4C). The distance ($D_3$) may be, for example, about 1 in or more. For example, the distance ($D_3$) may be about 13 in. In some embodiments, the inside perch 274 and the inside resilient member 206b are located such that a longitudinal axis 292 of the inside resilient member 206b is longitudinally offset forward of the rotational axis 166 of the rear wheel 156 (and of the drive axle 164 of the motor 162) by a given distance ($D_3$) (see, e.g., FIG. 4C). The distance ($D_4$) may be, for example, about 1 in or more. For example, the distance ($D_4$) may be about 14 in.

The outside resilient member 206a and the inside resilient member 206b may provide for dampening jarring and vibrations of the trailing arm 202 associated with impacts to the rear wheel 156. For example, when the trailing arm 202 is urged upward along the arced path (e.g., as represented by arrow 216 of FIGS. 4A and 4C) (e.g., when the mower 100 is moving forward across the ground and the rear wheel 156 encounters an impediment that urges the rear wheel 156 upward), the outside resilient member 206a and the inside resilient member 206b may be compressed. As a result of the compression, the outside resilient member 206a and the inside resilient member 206b may generate a corresponding restoring/downward biasing force that biases the trailing arm 202 downward, toward its original position (e.g., as represented by arrow 294 of FIGS. 4A-4D). This may regulate the upward movement of the trailing arm 202 and components attached thereto to dampen associated jarring and vibrations. As a further example, when the trailing arm 202 is urged downward along the arced path (e.g., as represented by the downward portion of arrow 216 of FIGS. 4A-4D) (e.g., when the mower 100 is moving forward across the ground and the rear wheel 156 encounters a depression, e.g., a hole, that encourages the rear wheel 156 to move downward), the outside resilient member 206a and the inside resilient member 206b may be extended. As a result of the extension, the outside resilient member 206a and the inside resilient member 206b may be placed in tension which generates a corresponding restoring/upward biasing force that biases the trailing arm 202 upward, toward its original position (e.g., as represented by arrow 298 of FIGS. 4A and 4C). This may regulate the downward movement of the trailing arm 202 and components attached thereto to dampen associated jarring and vibrations.

In some embodiments, the resilient members 206 are formed of a resilient material. For example, the resilient members 206a and 206b may be formed of an elastomer, such as rubber or another elastic polymer. When the resilient member 206a or 206b is subject to an applied force, the member may deform until it generates a biasing force that is sufficient to counteract the applied force. After the force is removed, the resilient member 206a and 206b may return to its shape with little to no retained deformation.

Figure 7:
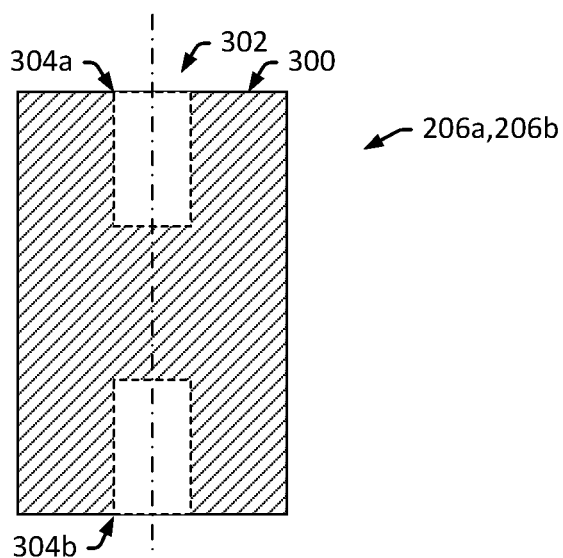
FIG. 7 is a diagram that illustrate a cross-sectioned view of a resilient member in accordance with one or more embodiments.

In some embodiments, each of the resilient members 206 has a cylindrical body 300 having integrated mounting locations 302 formed therein (see, e.g., FIG. 7). The cylindrical body 300 may, for example, be formed of a resilient material. The integrated mounting locations may, for example, include top and bottom female threaded holes 304a and 304b into which a bolt or similar fastener can be secured. For example, a resilient member 206 may be disposed between a perch 270 and a corresponding supporting surface of the frame 102. A bolt may be secured through a hole in the upper surface of the perch 270 and into the bottom female threaded hole 304b to secure the resilient member 206 to the perch 270 and a bolt may be secured through a hole in the complementary supporting surface of the frame 102 and into the top female threaded hole 304a to secure the resilient member 206 to the supporting surface of the frame 102.

In some embodiments, the drive unit mount 228 provides for coupling of components of the drive unit 152 to the trailing arm 202. For example, the trailing arm body 220 may include a drive unit mount 228 that includes a motor opening (or "cutout") 322 and fastening holes 324 that enable coupling of the motor 162 to the trailing arm body 220 (see, e.g., FIGS. 3 and 4C). The motor opening 322 may include a cutout (or similar opening) through the trailing arm body 220 that enables positioning the motor 162 such that it extends lateral through the trailing arm body 220. A flange 325 of the motor 162 (see, e.g., FIG. 3) may, for example, be secured to the trailing arm body 220 by way of bolts (or similar fasteners) disposed in the fastening holes 324 (see, e.g., FIGS. 3, 4C, 4D, 5A, 5B, 5C and 5D). In some embodiments, the motor 162 of the drive unit 152 is positioned such that a "nose" portion of the motor 162 and the drive axle 164 extend laterally "outward" from (or "outside of") the trailing arm body 220 (e.g., where it can be coupled to the rear wheel 156 and related wheel components, such as brake rotors 326 and calipers 328), and a "tail" portion of the motor 162 (e.g., including hydraulic motor components) extends laterally "inward" from (or "inside of") the trailing arm body 220 (see, e.g., FIGS. 2, 3, 5C and 5D). In some embodiments, the trailing arm body 220 includes a hose pass-through 310 (see, e.g., FIGS. 2 and 3, 4C, 4D, 5A and 5B). The hose pass-through 310 may include a cutout (or similar opening) through the trailing arm body 220 that enables routing of hydraulic hoses to the motor 162 of the drive unit 152. For example, the hydraulic hoses 168 may be routed from the pump 160 to the motor 162 by way of the hose pass-through 310 (see, e.g., FIG. 2).

What is claimed is:

1. A zero-turn radius (ZTR) riding mower system, comprising:
a trailing arm independent rear suspension system configured to support a mower frame of the ZTR mower system relative to a hydraulic drive system of the ZTR mower system, the hydraulic drive system comprising:
a left hydraulic drive unit configured to drive rotation of a left rear wheel of the ZTR mower system, the left hydraulic drive unit comprising:
a left hydraulic pump unit;
a left hydraulic motor unit; and
a left axle configured to couple to the left rear wheel, wherein the left hydraulic drive unit is configured to rotate the left axle to drive the rotation of the left rear wheel; and
a right hydraulic drive unit configured to drive rotation of a right rear wheel of the ZTR mower system, the right hydraulic drive unit comprising:
a right hydraulic pump unit;
a right hydraulic motor unit; and
a right axle configured to couple to the right rear wheel, wherein the right hydraulic drive unit is configured to rotate the right axle to drive the rotation of the right rear wheel,
the trailing arm independent rear suspension system comprising:
a left trailing arm suspension system comprising:
a left trailing arm configured to support the left hydraulic motor unit and the left rear wheel, the left trailing arm comprising:
a leading end configured to pivotally couple to the mower frame by way of a left leading end ball joint, wherein the left trailing arm is configured to pivot about a left leading end pivot location defined by the left leading end ball joint;
a trailing end comprising a left hydraulic drive unit mount, wherein the left hydraulic drive unit is configured to couple to the left hydraulic drive unit mount;
an upper left lateral control arm comprising:
an upper left inner end configured to pivotally couple to the mower frame by way of an upper left inside end joint; and
an upper left outer end configured to pivotally couple to the trailing end of the left trailing arm by way of an upper left outside end joint; and
a lower left lateral control arm comprising:
a lower left inner end configured to pivotally couple to the mower frame by way of a lower left inside end joint; and
a lower left outer end configured to pivotally couple to the trailing end of the left trailing arm by way of a lower left outside end joint; and
a right trailing arm suspension system comprising:
a right trailing arm configured to support the right hydraulic motor unit and the right rear wheel, the right trailing arm comprising:
a leading end configured to pivotally couple to the mower frame by way of a right leading end ball joint, wherein the right trailing arm is configured to pivot about a right leading end pivot location defined by the right leading end ball joint;
a trailing end comprising a right hydraulic drive unit mount, wherein the right hydraulic drive unit is configured to couple to the right hydraulic drive unit mount;
an upper right lateral control arm comprising:
an upper right inner end configured to pivotally couple to the mower frame by way of an upper right inside end joint; and
an upper right outer end configured to pivotally couple to the trailing end of the right trailing arm by way of an upper right outside end joint; and
a lower right lateral control arm comprising:
a lower right inner end configured to pivotally couple to the mower frame by way of a lower right inside end joint; and
a lower right outer end configured to pivotally couple to the trailing end of the right trailing arm by way of a lower right outside end joint.

2. The system of claim 1,
wherein the left leading end ball joint is configured to enable the left trailing arm to pivot in three dimensions about the left leading end pivot location, and
wherein the right leading end ball joint is configured to enable the right trailing arm to pivot in three dimensions about the right leading end pivot location.

3. The system of claim 1,
wherein the left leading end ball joint comprises a spherical bearing configured to enable the left trailing arm to pivot in multiple dimensions about the left leading end pivot location, and
wherein the right leading end ball joint comprises a spherical bearing configured to enable the right trailing arm to pivot in multiple dimensions about the right leading end pivot location.

4. The system of claim 1,
wherein a length of the left trailing arm is adjustable to enable adjustment of longitudinal positioning of the left axle and the left rear wheel, and
wherein a length of the right trailing arm is adjustable to enable adjustment of longitudinal positioning of the right axle and the right rear wheel.

5. The system of claim 1,
wherein the left leading end ball joint comprises an adjustable joint configured to enable adjustment of longitudinal positioning of the left axle and the left rear wheel, and
wherein the right leading end ball joint comprises an adjustable joint configured to enable adjustment of longitudinal positioning of the right axle and the right rear wheel.

6. The system of claim 1,
wherein the left leading end ball joint comprises an adjustable ball joint configured to enable adjustment of a distance between the left leading end pivot location and a rotational axis of the left axle, and wherein the right leading end ball joint comprises an adjustable ball joint configured to enable adjustment of a distance between the right leading end pivot location and a rotational axis of the right axle.

7. The system of claim 1,
wherein the upper left inside end joint comprises a ball joint, and wherein the upper left lateral control arm is configured to pivot about an upper left inside pivot location defined by the ball joint of the upper left inside end joint,
wherein the upper left outside end joint comprises a ball joint, and wherein the upper left lateral control arm is configured to pivot about an upper left outside pivot location defined by the ball joint of the upper left outside end joint,
wherein the upper right inside end joint comprises a ball joint, and wherein the upper right lateral control arm is configured to pivot about an upper right inside pivot location defined by the ball joint of the upper right inside end joint, and
wherein the upper right outside end joint comprises a ball joint, and wherein the upper right lateral control arm is configured to pivot about an upper right outside pivot location defined by the ball joint of the upper right outside end joint.

8. The system of claim 1,
wherein a length of at least one of the upper left lateral control arm and the lower left lateral control arm is adjustable, and
wherein a length of at least one of the upper right lateral control arm and the lower right lateral control arm is adjustable.

9. The system of claim 1,
wherein the left hydraulic drive unit mount comprises an opening in the trailing end of the left trailing arm that is configured to accept the left hydraulic motor unit, and
wherein the right hydraulic drive unit mount comprises an opening in the trailing end of the right trailing arm that is configured to accept the right hydraulic motor unit.

10. The system of claim 1,
wherein the left leading end pivot location is vertically offset above a rotational axis of the left axle, and
wherein the right leading end pivot location is vertically offset above a rotational axis of the right axle.

11. The system of claim 1,
wherein the left trailing arm is oriented substantially parallel to a longitudinal axis of the ZTR riding mower system,
wherein the upper left lateral control arm and the lower left lateral control arm are oriented transverse to the longitudinal axis of the ZTR riding mower system,
wherein the right trailing arm is oriented substantially parallel to the longitudinal axis of the ZTR riding mower system, and
wherein the upper right lateral control arm and the lower right lateral control arm are oriented transverse to the longitudinal axis of the ZTR riding mower system.

12. The system of claim 1,
wherein the left trailing arm suspension system further comprises a left resilient member configured to dampen movement of the left trailing arm, and
wherein the right trailing arm suspension system further comprises a right resilient member configured to dampen movement of the right trailing arm.

13. The system of claim 1,
wherein the left trailing arm suspension system further comprises a left resilient member disposed between the left trailing arm and an element of the mower frame, and
wherein the right trailing arm suspension system further comprises a right resilient member disposed between the right trailing arm and an element of the mower frame.

14. The system of claim 1,
wherein the left hydraulic pump unit is remote from the left hydraulic motor unit and is fluidly coupled to the left hydraulic motor unit by way of left flexible hoses, and
wherein the right hydraulic pump unit is remote from the right hydraulic motor unit and is fluidly coupled to the right hydraulic motor unit by way of right flexible hoses.

15. A riding mower system, comprising:
a trailing arm independent rear suspension system configured to support a hydraulic drive system of the mower system, the hydraulic drive system comprising:
  a left hydraulic drive unit comprising:
    a left hydraulic motor unit; and
    a left axle configured to couple to a left rear wheel, wherein the left hydraulic motor unit is configured to rotate the left axle to drive rotation of the left rear wheel; and
  a right hydraulic drive unit comprising:
    a right hydraulic motor unit; and
    a right axle configured to couple to a right rear wheel, wherein the right hydraulic motor unit is configured to rotate the right axle to drive rotation of the right rear wheel,
the trailing arm independent rear suspension system comprising:
  a left trailing arm suspension system comprising:
  a left trailing arm configured to support the left hydraulic motor unit, the left trailing arm comprising:
    a leading end configured to pivotally couple to a frame of the mower by way of a left leading end spherical joint, wherein the left trailing arm is configured to pivot about a left leading end pivot location defined by the left leading end spherical joint;
    a trailing end comprising a left hydraulic drive unit mount, wherein the left hydraulic drive unit is configured to couple to the left hydraulic drive unit mount;
  an upper left lateral control arm comprising:
    an upper left inner end configured to pivotally couple to the frame of the mower by way of an upper left inside end joint;
    an upper left outer end configured to pivotally couple to the trailing end of the left trailing arm by way of an upper left outside end joint; and
  a lower left lateral control arm comprising:
    a lower left inner end configured to pivotally couple to the frame of the mower by way of a lower left inside end joint; and
    a lower left outer end configured to pivotally couple to the trailing end of the left trailing arm by way of a lower left outside end joint; and
a right trailing arm suspension system comprising:
  a right trailing arm configured to support the right hydraulic motor unit, the right trailing arm comprising:

a leading end configured to pivotally couple to the frame by way of a right leading end spherical joint, wherein the right trailing arm is configured to pivot about a right leading end pivot location defined by the right leading end spherical joint;
a trailing end comprising a right hydraulic drive unit mount, wherein the right hydraulic drive unit is configured to couple to the right hydraulic drive unit mount;
an upper right lateral control arm comprising:
an upper right inner end configured to pivotally couple to the frame of the mower by way of an upper right inside end joint;
an upper right outer end configured to pivotally couple to the trailing end of the right trailing arm by way of an upper right outside end joint; and
a lower right lateral control arm comprising:
a lower right inner end configured to pivotally couple to the frame of the mower by way of a lower right inside end joint; and
a lower right outer end configured to pivotally couple to the trailing end of the right trailing arm by way of a lower right outside end joint.

16. The system of claim 15,
wherein the left leading end spherical joint is configured to enable the left trailing arm to pivot in multiple dimensions about the left leading end pivot location, and
wherein the right leading end spherical joint is configured to enable the right trailing arm to pivot in multiple dimensions about the right leading end pivot location.

17. The system of claim 15,
wherein the left leading end spherical joint comprises a spherical bearing configured to enable the left trailing arm to pivot in multiple dimensions about the left leading end pivot location, and
wherein the right leading end spherical joint comprises a spherical bearing configured to enable the right trailing arm to pivot in multiple dimensions about the right leading end pivot location.

18. The system of claim 15,
wherein a length of the left trailing arm is adjustable to enable adjustment of longitudinal positioning of the left axle, and
wherein a length of the right trailing arm is adjustable to enable adjustment of longitudinal positioning of the right axle.

19. The system of claim 15,
wherein the left leading end spherical joint comprises an adjustable joint configured to enable adjustment of a length of the left trailing arm, and
wherein the right leading end spherical joint comprises an adjustable joint configured to enable adjustment of a length of the right trailing arm.

20. The system of claim 15,
wherein the left leading end spherical joint comprises an adjustable joint configured to enable adjustment of a distance between the left leading end pivot location and a rotational axis of the left axle, and
wherein the right leading end spherical joint comprises an adjustable joint configured to enable adjustment of a distance between the right leading end pivot location and a rotational axis of the right axle.

21. The system of claim 15,
wherein the upper left inside end joint comprises a spherical joint, and wherein the upper left lateral control arm is configured to pivot about an upper left inside pivot location defined by the spherical joint of the upper left inside end joint,
wherein the upper left outside end joint comprises a spherical joint, and wherein the upper left lateral control arm is configured to pivot about an upper left outside pivot location defined by the spherical joint of the upper left outside end joint,
wherein the lower left inside end joint comprises a spherical joint, and wherein the lower left lateral control arm is configured to pivot about a lower left inside pivot location defined by the spherical joint of the lower left inside end joint,
wherein the lower left outside end joint comprises a spherical joint, and wherein the lower left lateral control arm is configured to pivot about a lower left outside pivot location defined by the spherical joint of the lower left outside end joint,
wherein the upper right inside end joint comprises a spherical joint, and wherein the upper right lateral control arm is configured to pivot about an upper right inside pivot location defined by the spherical joint of the upper right inside end joint,
wherein the upper right outside end joint comprises a spherical joint, and wherein the upper right lateral control arm is configured to pivot about an upper right outside pivot location defined by the spherical joint of the upper right outside end joint,
wherein the lower right inside end joint comprises a spherical joint, and wherein the lower right lateral control arm is configured to pivot about a lower right inside pivot location defined by the spherical joint of the lower right inside end joint, and
wherein the lower right outside end joint comprises a spherical joint, and wherein the lower right lateral control arm is configured to pivot about a lower right outside pivot location defined by the spherical joint of the lower right outside end joint.

22. The system of claim 15,
wherein a length of at least one of the upper left lateral control arm and the lower left lateral control arm is adjustable, and
wherein a length of at least one of the upper right lateral control arm and the lower right lateral control arm is adjustable.

23. The system of claim 15,
wherein the left hydraulic drive unit mount comprises an opening in the trailing end of the left trailing arm, and
wherein the right hydraulic drive unit mount comprises an opening in the trailing end of the right trailing arm.

24. The system of claim 15,
wherein the left leading end pivot location is vertically offset above a rotational axis of the left axle, and
wherein the right leading end pivot location is vertically offset above a rotational axis of the right axle.

25. The system of claim 15,
wherein the left trailing arm is oriented substantially parallel to a longitudinal axis of the riding mower system, and wherein the upper left lateral control arm and the lower left lateral control arm are oriented transverse to the longitudinal axis of the riding mower system, and
wherein the right trailing arm is oriented substantially parallel to a longitudinal axis of the riding mower system, and wherein the upper right lateral control arm and the lower right lateral control arm are oriented transverse to the longitudinal axis of the riding mower system.

26. The system of claim 15,
wherein the left trailing arm suspension system further comprises a left resilient member configured to dampen movement of the left trailing arm, and
wherein the right trailing arm suspension system further comprises a right resilient member configured to dampen movement of the right trailing arm.

27. The system of claim 15,
wherein the left trailing arm suspension system further comprises a left resilient member disposed between the left trailing arm and the frame of the mower, and
wherein the right trailing arm suspension system further comprises a right resilient member disposed between the right trailing arm and the frame of the mower.

28. The system of claim 15,
wherein the left hydraulic motor unit is fluidly coupled to a remote left hydraulic pump unit by way of left flexible hoses, and
wherein the right hydraulic motor unit is fluidly coupled to a remote right hydraulic pump unit by way of right flexible hoses.

29. A riding mower trailing arm independent rear suspension system, comprising:
a left trailing arm suspension system comprising:
a left trailing arm configured to support a left hydraulic drive unit that is configured to drive rotation of a left rear wheel of a riding mower system, the left trailing arm comprising:
a leading end configured to pivotally couple to a frame of the mower by way of a left leading end spherical joint, wherein the left trailing arm is configured to pivot about a left leading end pivot location defined by the left leading end spherical joint;
a trailing end comprising a left hydraulic drive unit mount, wherein the left hydraulic drive unit is configured to couple to the left hydraulic drive unit mount;
an upper left lateral control arm configured to pivotally couple to the frame of the mower by way of an upper left inside joint and configured to pivotally couple to the trailing end of the left trailing arm by way of an upper left outside joint; and
a lower left lateral control arm configured to pivotally couple to the frame of the mower by way of a lower left inside joint and configured to pivotally couple to the trailing end of the left trailing arm by way of a lower left outside joint; and
a right trailing arm suspension system comprising:
a right trailing arm configured to support a right hydraulic drive unit that is configured to drive rotation of a right rear wheel of the riding mower system, the right trailing arm comprising:
a leading end configured to pivotally couple to the frame of the mower by way of a right leading end spherical joint, wherein the right trailing arm is configured to pivot about a right leading end pivot location defined by the right leading end spherical joint;
a trailing end comprising a right hydraulic drive unit mount, wherein the right hydraulic drive unit is configured to couple to the right hydraulic drive unit mount;
an upper right lateral control arm configured to pivotally couple to the frame of the mower by way of an upper right inside joint and configured to pivotally couple to the trailing end of the right trailing arm by way of an upper right outside joint; and
a lower right lateral control arm configured to pivotally couple to the frame of the mower by way of a lower right inside joint and configured to pivotally couple to the trailing end of the right trailing arm by way of a lower right outside joint.

* * * * *